(12) United States Patent
Van Esbroeck et al.

(10) Patent No.: US 11,969,946 B2
(45) Date of Patent: Apr. 30, 2024

(54) AUTOMATED ADDITIVE MANUFACTURING DEVICE AND METHOD

(71) Applicant: Structo Pte. Ltd., Singapore (SG)

(72) Inventors: Hubertus Theodorus Petrus Van Esbroeck, Singapore (SG); Boyle Suwono, Singapore (SG); Harsh Gupta, Singapore (SG)

(73) Assignee: Structo Pte. Ltd., Singapore (SG)

( * ) Notice: Subject to any disclaimer, the term of this patent is extended or adjusted under 35 U.S.C. 154(b) by 0 days.

(21) Appl. No.: 16/969,178

(22) PCT Filed: Feb. 12, 2019

(86) PCT No.: PCT/SG2019/050078
§ 371 (c)(1),
(2) Date: Aug. 11, 2020

(87) PCT Pub. No.: WO2019/156638
PCT Pub. Date: Aug. 15, 2019

(65) Prior Publication Data
US 2020/0368973 A1    Nov. 26, 2020

(30) Foreign Application Priority Data

Feb. 12, 2018  (SG) ............................ 10201801184R
Oct. 4, 2018   (SG) .......................... 10201808790W

(51) Int. Cl.
*B29C 64/00*     (2017.01)
*A61C 13/00*     (2006.01)
(Continued)

(52) U.S. Cl.
CPC ........ *B29C 64/393* (2017.08); *A61C 13/0004* (2013.01); *A61C 13/0013* (2013.01);
(Continued)

(58) Field of Classification Search
CPC ... B29C 64/393; B29C 64/264; B29C 64/245; B29C 64/255; B29C 64/35;
(Continued)

(56) References Cited

U.S. PATENT DOCUMENTS 9,469,076 B1 * 10/2016 Crossen ................. B33Y 40/00
9,763,750 B2 *  9/2017 Kim ....................... B29C 64/386
(Continued)

FOREIGN PATENT DOCUMENTS

CA          3007533 A1     5/2017
CN        101426631 A1     5/2009
(Continued)

OTHER PUBLICATIONS

Zheng et al., EPO Machine Tranlsation of CN-108068331-A (Year: 2018).*

(Continued)

*Primary Examiner* — Larry W Thrower
*Assistant Examiner* — John W Hatch
(74) *Attorney, Agent, or Firm* — Optimus Patents US, LLC

(57) ABSTRACT

An additive manufacturing system comprising: an additive manufacturing device, said device including: a resin vessel for containing a material which is polymerisable on exposure to radiation; a build platform having a build surface arranged to have an object manufactured thereon; a radiation source; said radiation source positioned to irradiate uncured material on said build surface to manufacture the object; said device in wireless communication with a central station; said central station arranged to process data to create manufacturing files; said central station arranged to communicate said files to said device such that the device manufactures the object based upon said files.

17 Claims, 25 Drawing Sheets

(51) Int. Cl.

| | | |
|---|---|---|
| *A61C 13/087* | (2006.01) | |
| *B29C 64/135* | (2017.01) | |
| *B29C 64/245* | (2017.01) | |
| *B29C 64/255* | (2017.01) | |
| *B29C 64/264* | (2017.01) | |
| *B29C 64/35* | (2017.01) | |
| *B29C 64/393* | (2017.01) | |
| *B33Y 10/00* | (2015.01) | |
| *B33Y 30/00* | (2015.01) | |
| *B33Y 40/20* | (2020.01) | |
| *B33Y 50/02* | (2015.01) | |
| *A61C 7/08* | (2006.01) | |

(52) U.S. Cl.
CPC ........ *A61C 13/0019* (2013.01); *A61C 13/087* (2013.01); *B29C 64/135* (2017.08); *B29C 64/245* (2017.08); *B29C 64/255* (2017.08); *B29C 64/264* (2017.08); *B29C 64/35* (2017.08); *B33Y 10/00* (2014.12); *B33Y 30/00* (2014.12); *B33Y 40/20* (2020.01); *B33Y 50/02* (2014.12); *A61C 7/08* (2013.01)

(58) Field of Classification Search
CPC ....... B29C 64/135; B29C 64/00; B33Y 10/00; B33Y 30/00; B33Y 40/00; B33Y 50/02; A61C 13/0013; A61C 13/0019; A61C 13/087; A61C 7/08
See application file for complete search history.

(56) References Cited

U.S. PATENT DOCUMENTS

| | | | |
|---|---|---|---|
| 2005/0027512 A1 | 2/2005 | Waise | |
| 2005/0275129 A1 | 12/2005 | Sambu et al. | |
| 2012/0195994 A1* | 8/2012 | El-Siblani | B33Y 40/20 15/320 |
| 2014/0265049 A1* | 9/2014 | Burris | B22F 12/90 264/497 |
| 2015/0016569 A1 | 1/2015 | Kuo | |
| 2015/0131074 A1 | 5/2015 | Ebert | |
| 2015/0165695 A1* | 6/2015 | Chen | B29C 64/35 425/132 |
| 2016/0013549 A1 | 1/2016 | Schaffner | |
| 2016/0135493 A1 | 5/2016 | Kuo et al. | |
| 2017/0017388 A1 | 1/2017 | Heo et al. | |
| 2017/0028622 A1* | 2/2017 | Westlind | G03F 7/0037 |
| 2017/0173888 A1 | 6/2017 | Thomas-Lepore et al. | |
| 2017/0334134 A1 | 11/2017 | Herzog | |
| 2020/0078831 A1* | 3/2020 | Converse | B29C 64/35 |
| 2020/0086553 A1* | 3/2020 | Mojdeh | B29C 64/232 |
| 2020/0324479 A1* | 10/2020 | Friedrich | B08B 3/10 |

FOREIGN PATENT DOCUMENTS

| | | | | |
|---|---|---|---|---|
| CN | 104708818 A1 | 6/2015 | | |
| CN | 105407746 A1 | 3/2016 | | |
| CN | 108068331 A * | 5/2018 | ............. | B33Y 30/00 |
| DE | 102009047237 A1 | 8/2011 | | |
| DE | 102009047237 A1 * | 8/2011 | ............. | B08B 3/104 |
| JP | 760843 A1 | 3/1995 | | |
| JP | H0760843 A1 | 3/1995 | | |
| JP | 2016-103279 A1 | 6/2016 | | |
| TW | 201522017 A1 | 6/2015 | | |
| WO | 2003030787 A1 | 4/2003 | | |
| WO | WO-2003030787 A1 * | 4/2003 | ......... | A61F 2/30942 |
| WO | 2006078304 A2 | 7/2006 | | |
| WO | WO-2006078304 A2 * | 7/2006 | ......... | A61C 13/0004 |
| WO | 2014202603 A1 | 12/2014 | | |
| WO | 2014202609 A1 | 12/2014 | | |
| WO | 2016207777 A1 | 12/2016 | | |
| WO | 2017109395 A1 | 6/2017 | | |
| WO | 2018226164 A2 | 12/2018 | | |
| WO | 2019067794 A1 | 4/2019 | | |
| WO | 2019156638 A1 | 8/2019 | | |

OTHER PUBLICATIONS

DE-102009047237-A1 English translation (Year: 2009).*
EPO Rule 164(1) Communication; EP Application No. 19750292.5, dated Oct. 7, 2021; pp. 1-14.
Foreign Communication from a Related Counterpart Application, International Search Report and Written Opinion dated Apr. 30, 2019, International Application No. PCT/SG2019/05078 filed on Feb. 12, 2019.
EPO Article 94(3) Communication, EPO Application Serial No. 19750292.5, dated Sep. 8, 2023; pp. 1-3.

\* cited by examiner

AUTOMATED ADDITIVE MANUFACTURING DEVICE AND METHOD

CROSS-REFERENCE TO RELATED APPLICATIONS

The present application is a filing under 35 U.S.C. 371 as the National Stage of International Application No. PCT/SG2019/050078, filed Feb. 12, 2019, entitled "AN AUTOMATED ADDITIVE MANUFACTURING DEVICE AND METHOD," which claims priority to Singapore Application No. SG 10201808790W filed with the Intellectual Property Office of Singapore on Oct. 4, 2018 and Singapore Application No. SG 10201801184R filed with the Intellectual Property Office of Singapore on Feb. 12, 2018, all of which are incorporated herein by reference in their entirety for all purposes.

TECHNICAL FIELD

This invention relates to a device capable of additive manufacturing with integrated and automated pre-processing and post-processing features.

BACKGROUND

Additive manufacturing has advanced rapidly in technology over the years, enabling the improvement in the speed of printing. With the advent of different new types of materials such as nylon, titanium and even human tissues being made available for printing, the potential use of additive manufacturing into our daily activities has increased greatly with boundless possibilities.

However, additive manufacturing processes require an immense amount of human involvement, effort and contribution. These processes typically comprise of three phases in pre-processing, printing and post-processing. For example in pre-processing, digital file preparation is a critical and often laborious step of the entire process of 3D printing to prepare the 3D model for printing, and an increasing degree of know-how is required for the printing of highly complex 3D object(s). Likewise in post-processing that involves washing the 3D printed object(s) with solvent, exposure with additional light for final curing, consumes time and effort for completing a routine and tedious process. Thus, the removal of such time consuming processes from the additive manufacturing process will greatly reduce time spent and enhance the operator's experience compared to typical additive manufacturing processes.

SUMMARY OF INVENTION

In a first aspect, the invention provides an additive manufacturing system comprising: an additive manufacturing device, said device including: a resin vessel for containing a material which is polymerisable on exposure to radiation; a build platform having a build surface arranged to have an object manufactured thereon; a radiation source; said radiation source positioned to irradiate uncured material on said build surface to manufacture the object; said device in wireless communication with a central station; said central station arranged to process data to create manufacturing files; said central station arranged to communicate said files to said device such that the device manufactures the object based upon said files.

In a second aspect, the invention provides an additive manufacturing device, comprising: a resin vessel for containing a material which is polymerisable on exposure to radiation, said resin vessel arranged to receive a print capsule; a build platform having a build surface arranged to have an object manufactured thereon; a radiation source positioned to irradiate uncured material on said build surface to manufacture the object; wherein said print capsule includes a metered volume of resin corresponding to a finite number of manufactured objects.

In a third aspect, the invention provides an additive manufacturing device, comprising: a resin vessel for containing a material which is polymerisable on exposure to radiation; a build platform having a build surface arranged to have an object manufactured thereon; a radiation source; said radiation source positioned to irradiate uncured material on said build surface to manufacture the object; a curing station arranged to receive the object and cure said object; at least one washing station arranged to receive the cured object and wash said object ready for use by an end user; wherein said curing station and washing stations are located on a rotatable tray, said rotatable tray arranged to sequentially rotate each station for receiving said object.

The present invention relates to an improved device and method capable of carrying out pre-processing (decentralised and/or centralised), printing and post-processing in a fully automated manner. The present invention also involves the removal of the file preparation step from the user's workflow and is instead carried out remotely, within the device or a combination of both. The centralised pre-processing as disclosed previously and is achieved by remotely uploading a file and specifications of the requirements and/or specifications of the end-product to be printed may be further given or instructed. In this workflow, the file is then processed remotely from the operator in one or more centralized locations serving a multitude of other similar operators.

File processing includes, but is not limited to, file fixing such as broken or inverted triangle mesh, holes in scan data, and other generic defects at the data level), support structure generation (automatic or manual), parts arrangement and nesting, and slicing into printable file. At various stages in the software preparation phase, the operators may provide feedback on the CAD designed appliance, or on the state of the printable file after remote processing. There may be an iterative design and preparation process, involving one or more back and forth communications between the operator and the centralized file preparation operator or artificial intelligence. The clinician may download the eventual printable output file or even choose to have it uploaded to a 3D printer directly via remote access and an internet connection.

In addition, the present invention may be capable of carrying out centralized pre-processing processes in the fully automated device, either without the need for an external source or entity or with the bulk of the computationally heavy processes de-centralised through internet. In this centralised system, the operator's or end-point user's data (e.g. intra-oral scanning, or the like) is collected, all software processes such as, but not limited to, file fixing, support generation (automatic or manual), parts arrangement, slicing to printable file, CAD design, exportation of digital data, pre-processing printing or exportation of printable data may be effectively and automatically conducted by software, data, system, program, application, blockchain, artificial intelligence, or the like, or any combination of these are carried out in the automated device (FIGS. 2 and 8). Some of these processes, for example, fixing of file and support generation are computationally heavy activities and currently available hardware technology may not be able fully support the centralized system. These activities, however, may be done in a decentralized location such as through an internet connection, or the like that is already established between the device and a designated cloud location or the like. In this instance, the rest of the non-heavy computational activities may be carried out in a decentralised location such as the fully automated device. In future, when such hardware technology is available, the entire process may be fully centralized.

In another example, the printer may autonomously begin printing once the file is transferred inbound from the centralized file preparation location. Once the operator has earlier set up or prepared the printer with all the necessary items to start and complete a print job such as fresh resin cartridge, an established internet connection, fresh cleaning solution, removal of any previous print jobs from the build plate or anything required for a printer to start its print, the printer is said to be in a "ready" state to autonomously begin printing, and then post-processing of the file as soon as it is downloaded from the centralized preparation location. This has the added benefit that this may be entirely completed without further human interaction after approval of the CAD file, including, this being carried out overnight in the absence of anyone in the location, such that the finished part is ready upon arrival in the next morning.

The present invention also relates to the automation of post-processing the 3D printed object(s) by combining, integrating and automating each of the printing, washing and post-curing steps, as well as any other post-processing steps that may be required for the fabrication of particular object(s). This workflow removes all human labour from pre-printing, print and post-processing steps, thus creating a seamless experience for the operator. The automated additive manufacturing device in the present invention will cover all procedures or processes required to generate a ready-to-use final object(s). None or very little is required from the operator's time as the entire work process from start to the final completion of the desired 3D object(s) is fully automated.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION OF EMBODIMENTS

The present invention relates to an improved device and method capable of carrying out pre-processing (decentralised and/or centralised), printing and post-processing in a fully automated manner. The automated device of the invention may vary in size. It may be presented as a small, compact or desktop-style device. This device may be capable of seamlessly receiving data or information, print, wash or/and cure, all at the push of a button.

Figure 1:
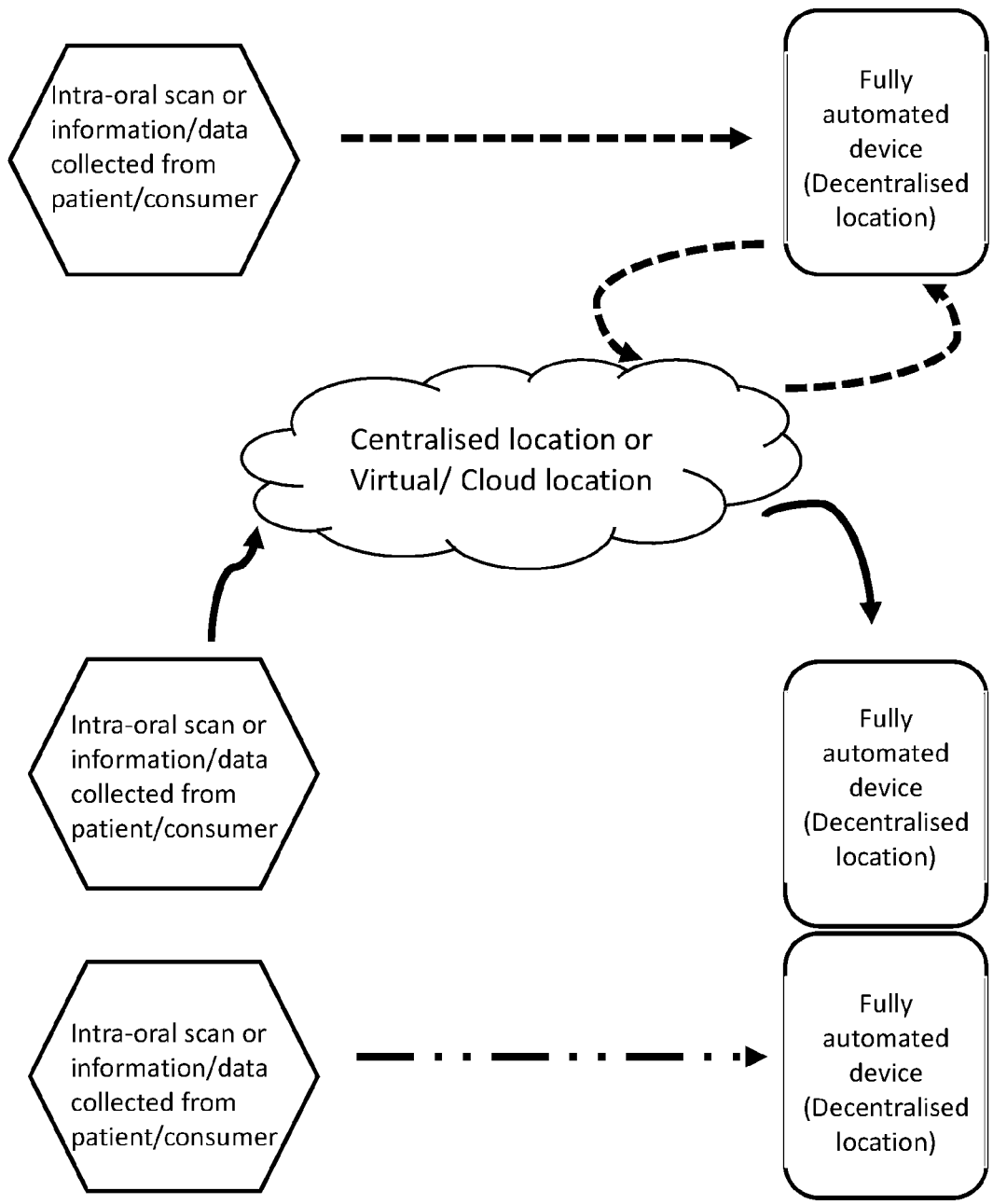
FIG. 1 is a schematic view of a system according to one embodiment of the present invention.

FIG. 1 shows the different ways which centralised and decentralised locations can be used in the system. Information or scanned data may be transferred to a centralised location. As part of pre-processing the data, the scanned data may be converted to a manufacturing file at a centralised location, the file may be transferred to a decentralised location which may be a fully automated device and may use the manufacturing file to manufacture an object according to said data. In another method, information or scanned data may be transferred to a centralised location first for processing and this is transferred back to a fully automated device or decentralised location or alternatively, information or scanned data may be transferred straight to a decentralised location for processing without the need of a centralised location.

The scanned data may be for any applicable object, including the dental information of a patient, for manufacturing by an appropriate professional. Said dental information may include a range of information, including the scanned image of a dental arrangement.

Figure 2:
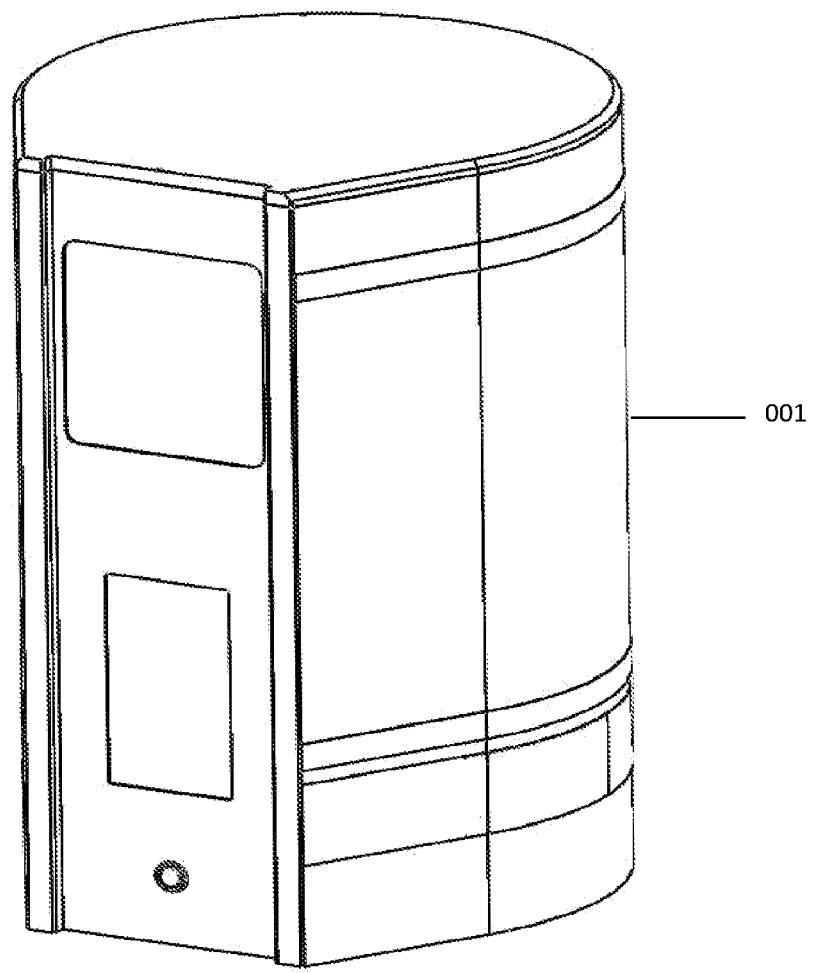
FIG. 2 is a schematic view of an enclosed automated additive manufacturing device.
Figure 3:
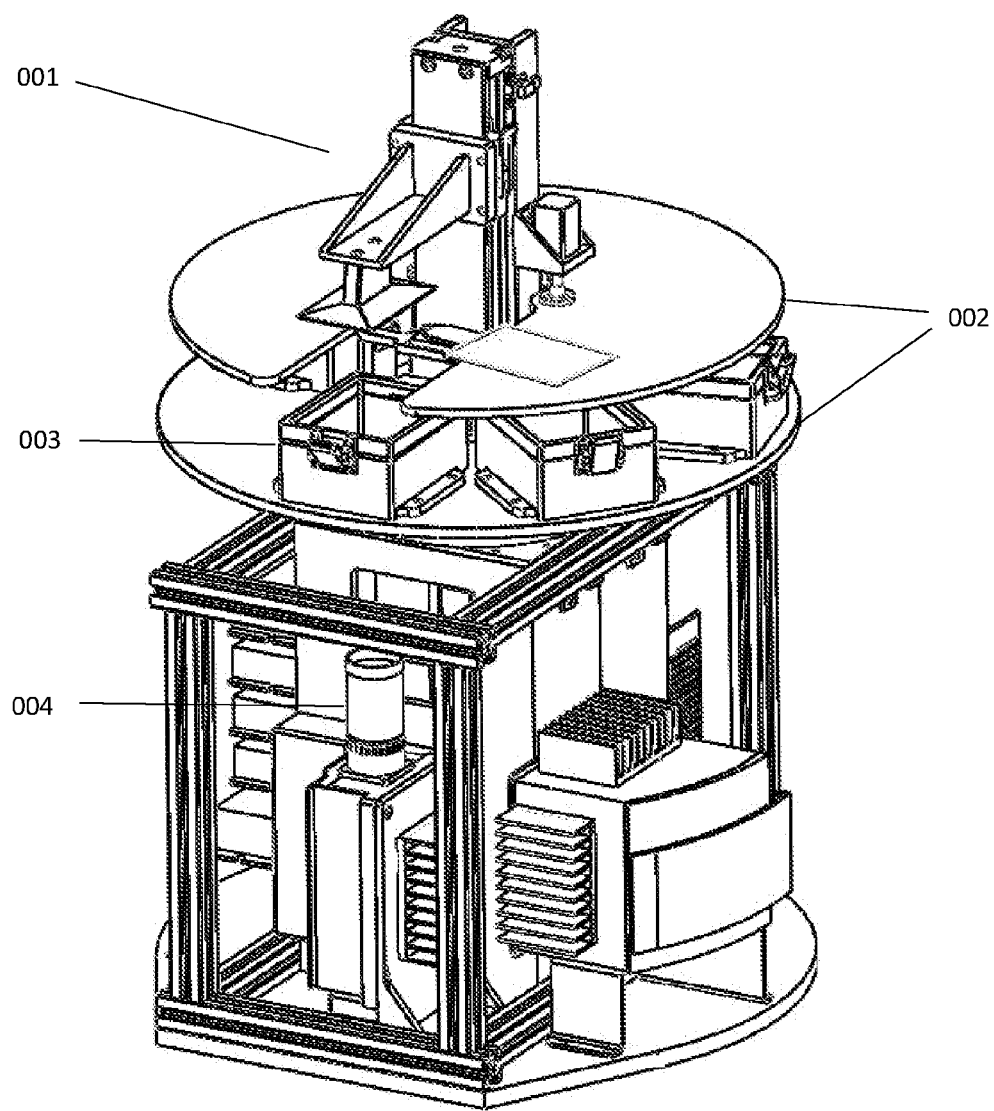
FIG. 3 is a schematic view of the interior of an automated additive manufacturing device.
Figure 8:
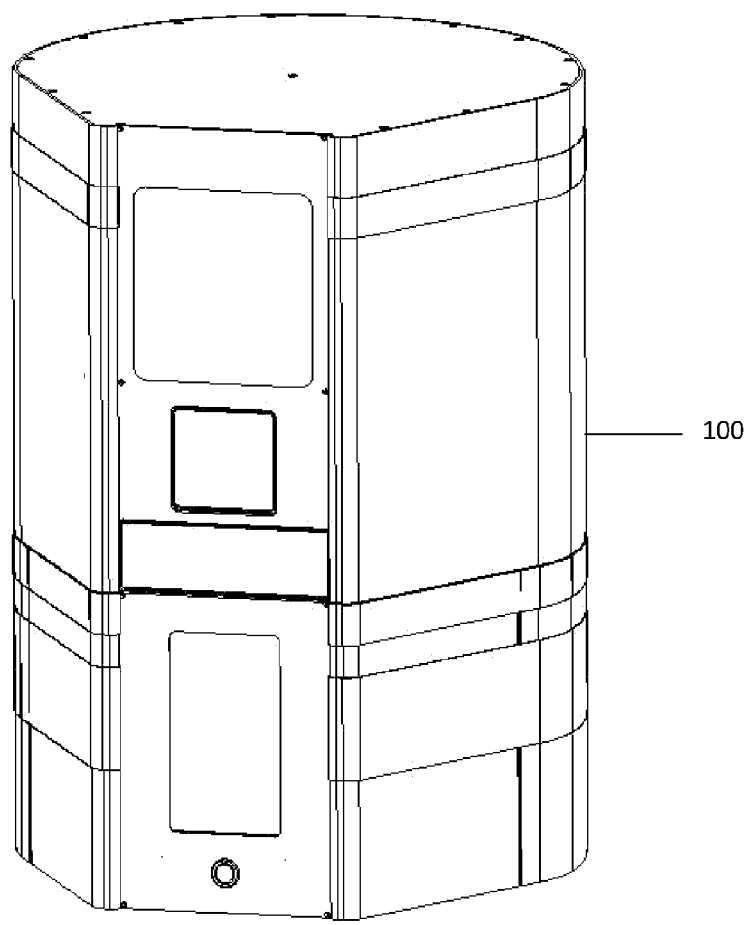
FIG. 8 shows an external view of the device of the present invention.

A system according to the present invention may be capable of carrying out centralized pre-processing processes in the fully automated device, either without the need for an external source or entity or with the bulk of the computationally heavy processes de-centralized through internet. In this centralized system, the patient's data (e.g. intra-oral scanning, or the like) is collected. All software processes such as, but not limited to, file fixing, support generation (automatic or manual), parts arrangement, slicing to printable file, CAD design, exportation of digital data, pre-processing printing or exportation of printable data may be effectively and automatically conducted by software, data, system, program, application, blockchain, artificial intelligence, or the like, or any combination of these are carried out in the automated device (FIGS. 2 and 8). Some of these processes, for example, fixing of file and support generation are computationally heavy activities and currently available hardware technology may not be able fully support the centralized system. These activities, however, may be done in a decentralized location such as through the internet connection, or the like that is already established between the device and a remote station through a designated cloud location or the like. In this instance, the rest of the non-heavy computational activities may be carried out in a decentralised location such as the fully automated device. In future, when such hardware technology is available, the entire process may be fully centralized.

As shown in FIGS. 2 to 8, device 001 may comprise of a plurality of trays 002 which may contain a resin vessel 003 for the containment or holding of materials such as photopolymer material to make 3D printing object(s) 010, produced by the irradiation of the photopolymer contained within resin vessel 003 or its internal vessel 005, with light of the appropriate wavelength from illumination device 004. The same illumination device 004 with the same light source, wavelength or illumination for printing may be used for post curing on the movable tray 006. The automated additive manufacturing device of the present invention may comprise more than one UV curing device. Illumination device 004 may be positioned directly underneath so that it projects directly or the projection can be reflected onto the build area with a reflective device. In addition, the illumination device 004 may be able to move accordingly to increase or decrease throw distance to control the size of the projected area for printing and/or pixel density. In an example, the illumination device may move in an upward and downward linear motion to increase or decrease throw distance and/or pixel density, allowing the print of objects with different sizes and/or printing accuracy requirements. An actuator system or other means for re-focusing may be used to re-focus the illumination device for optimal performance while printing. The pixel density and focus may be assessed using a light sensor or the like in the device printing area, providing a feedback loop to the re-focusing actuator system, to ensure optimal focusing for accurate printing.

Figure 4:
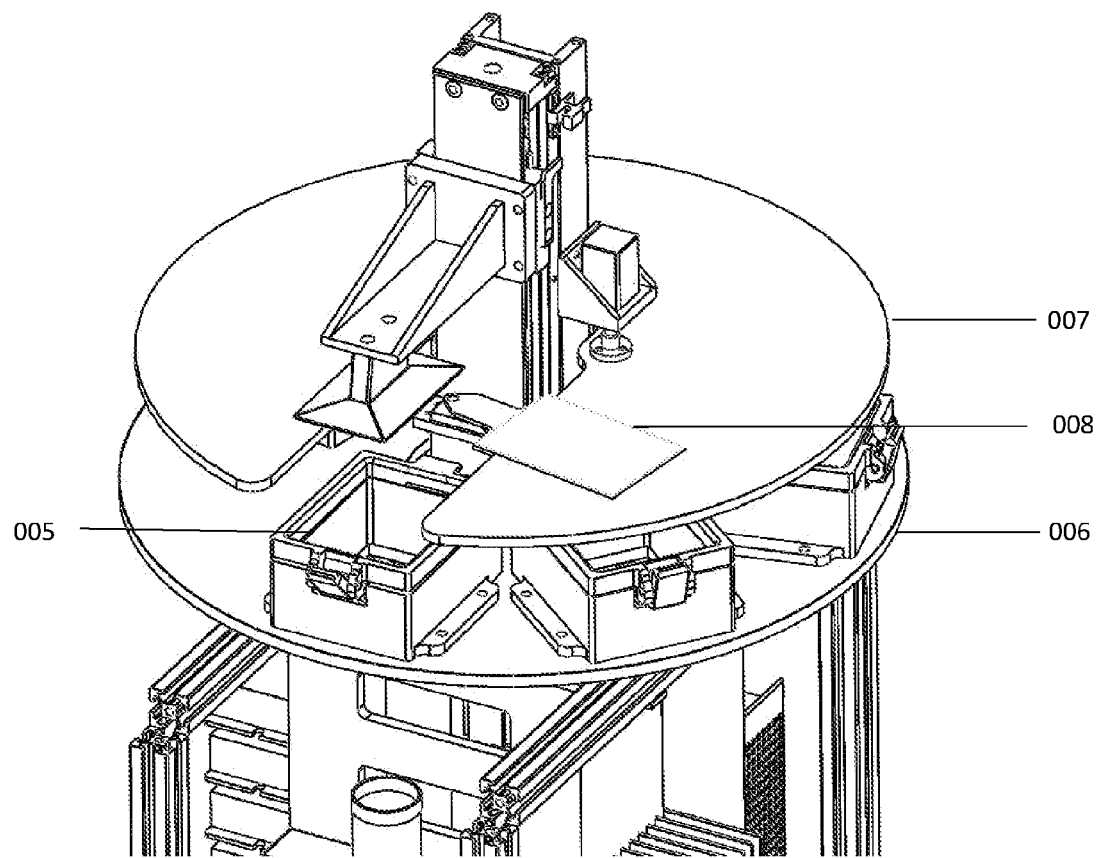
FIG. 4 is a schematic view of a rotational movable tray with vessels, drip tray and protective cover.

Movable tray 006 may move in a rotary direction and may be controlled by an outer ring gear and a smaller spur gear. The smaller spur gear is controlled by a motor which allows precise accuracy in the movement of the movable tray and therefore the positioning of the vessels. The movable tray can also move by other means as long as it facilitates the precise movement of the various vessels and devices. In one embodiment of the invention, a protective cover 007 is situated just above the movable tray 006 (FIG. 4). The protective cover 007 applies pressure against the capsules, multiple vessels or devices situated on the movable tray 006 to prevent odours or vapours from leaking, evaporation and/or contamination of contents. The protective cover 007 may be made of plastic, metal, aluminium, glass or any materials that prevents leaks or evaporation. There is an additional layer of foam or rubber or other compressible material at the bottom of the protective cover, which with the application of pressure, acts as a gasket such that the protective cover seals the enclosed vessels. There may be a pair of lead screws with a motor or other similar means attached to the protective cover which moves in the z axis to allow easy removal of any items on the movable tray such as resin tanks, capsules, multiple vessels or devices. This pair of lead screws or other similar means with motor also allows the protective cover to move upwards when the movable tray is moving. When the movable tray is not in motion, the protective cover applies pressure against the capsules, multiple vessels or devices. The protective cover may be moved by any other means capable of moving the protective cover with sufficient accuracy and speed.

An embodiment of the invention comprises of a drip tray 008 which prevent excess drips and contamination from resin, materials or solutions in vessels or devices while the movable tray is moving after completion in one of the printing or cleaning/washing/curing processes and advancing to the next. The drip tray 008 moves directly under the building platform and/or printed object to act as a cover for the capsules, multiple vessels or devices whenever the movable tray moves. The drip tray moves away from under the building platform and/or printed object once any of the printing, cleaning/washing, curing procedures needs to be carried out. In another embodiment of the invention, the status of the automated additive manufacturing device of the present invention is displayed or indicated, either visually or any other means. Visual presentation may be in the form of LED lights. These LED lights maybe situated at the bottom of the automated additive manufacturing device or any other parts of the device. The status of the device is indicated by a change in the different array of LED colours when the device is switched on, paused or during each procedural stage of printing, washing or curing.

Figure 5:
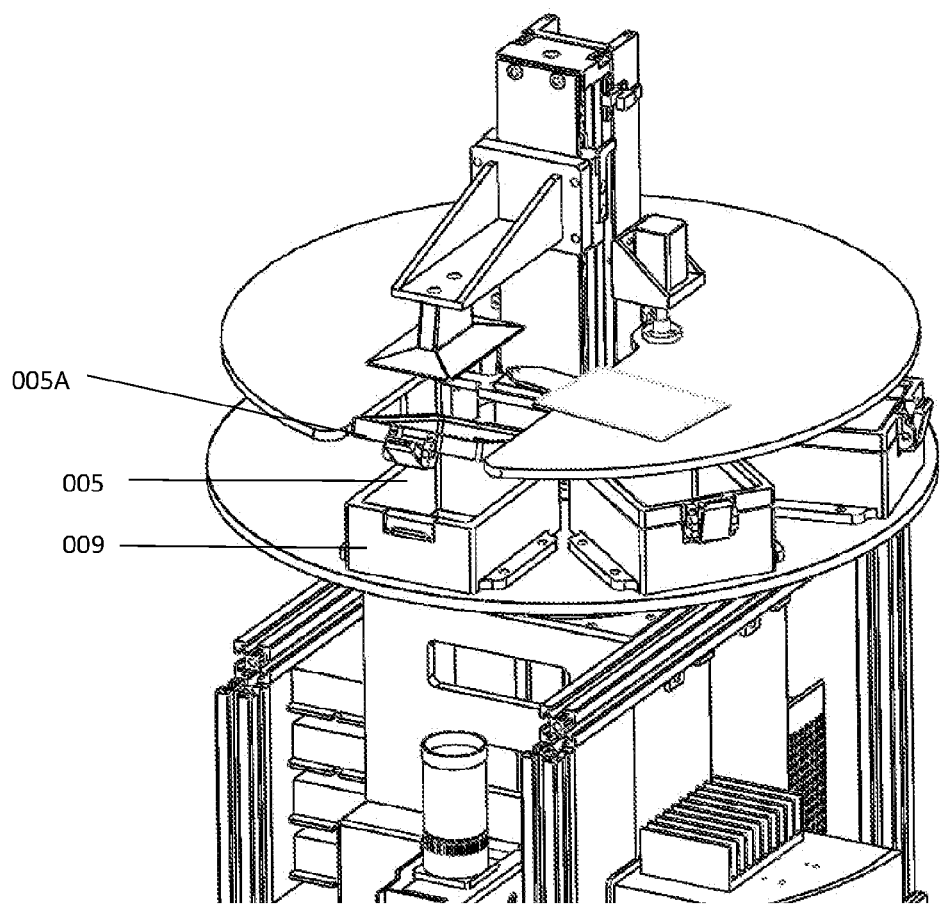
FIG. 5 is a schematic view of a clip-on system where the upper lid holder is lowered and fastened to the lower lid holder after the internal vessel or capsule is inserted into the external vessel.
Figure 6:
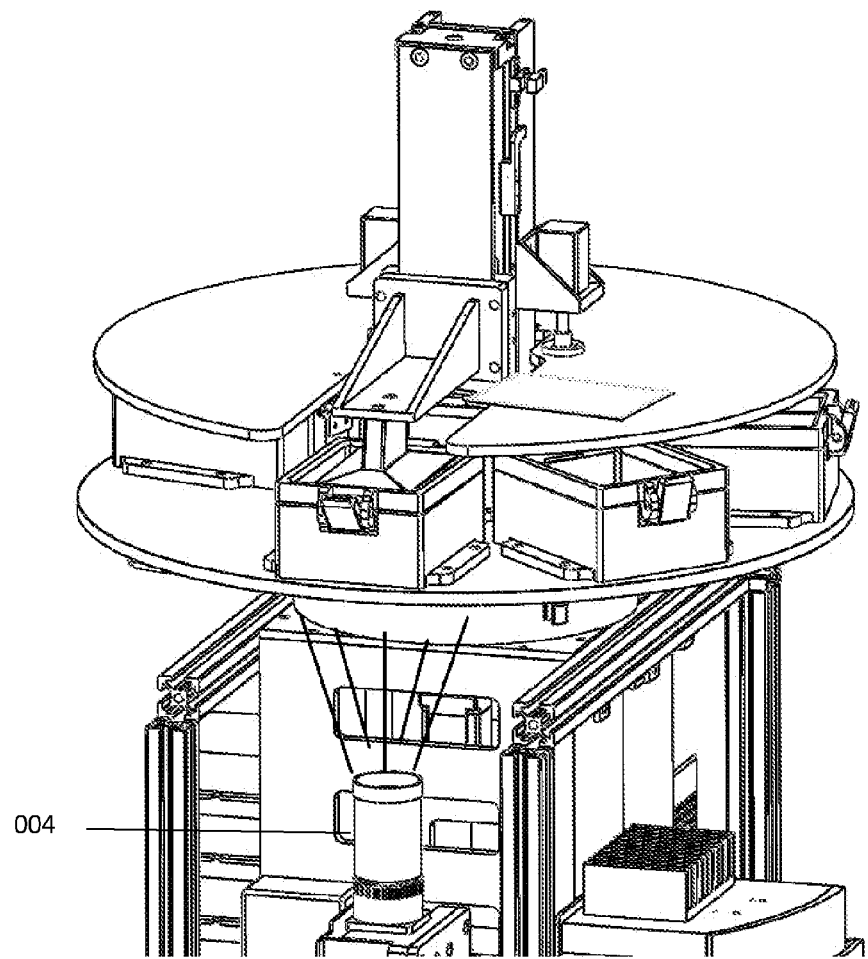
FIG. 6 is a schematic view of the process of printing from an automated additive manufacturing device.
Figure 7:
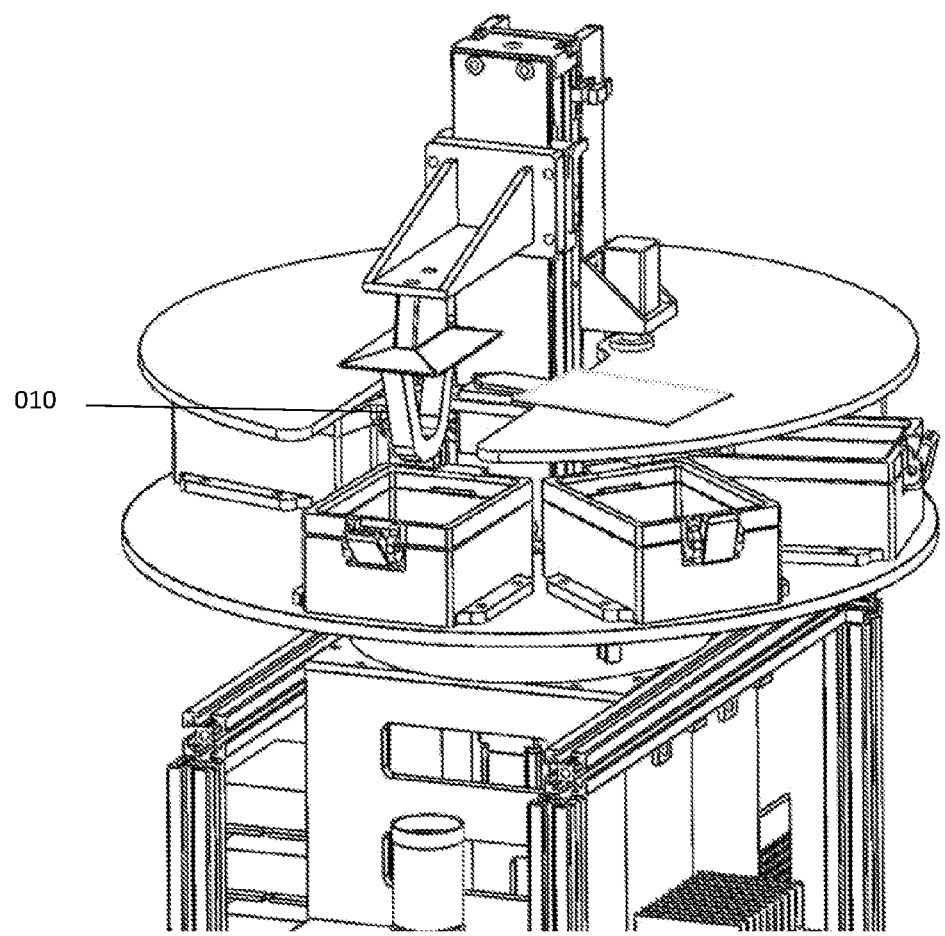
FIG. 7 is a schematic view of a 3D object printed from an automated additive manufacturing device.

In FIG. 5, the external vessel 009 may have a base/bottom which may or may not be transparent or may lack a bottom wall surface such that the bottom surface of the internal vessel is the only boundary between the photopolymer material and the illumination source below. In one example, the external holder or a capsule holder is a clip-on system whereby once the internal vessel has been positioned in place on the lower lid-holder, the upper lid holder which is attached to the lower lid-holder via a hinge, will be lowered and fastened into place using a clamp or latch 005A (FIG. 5). In other exemplifications, the internal vessel 005 is held in place by the external vessel by any other means such as a slot-in system or other known methods as long as the vessels are held securely in place. There may be more than one resin vessel to facilitate the printing of different or the same 3D object/s that require/s different resins or photopolymer materials.

Figure 9:
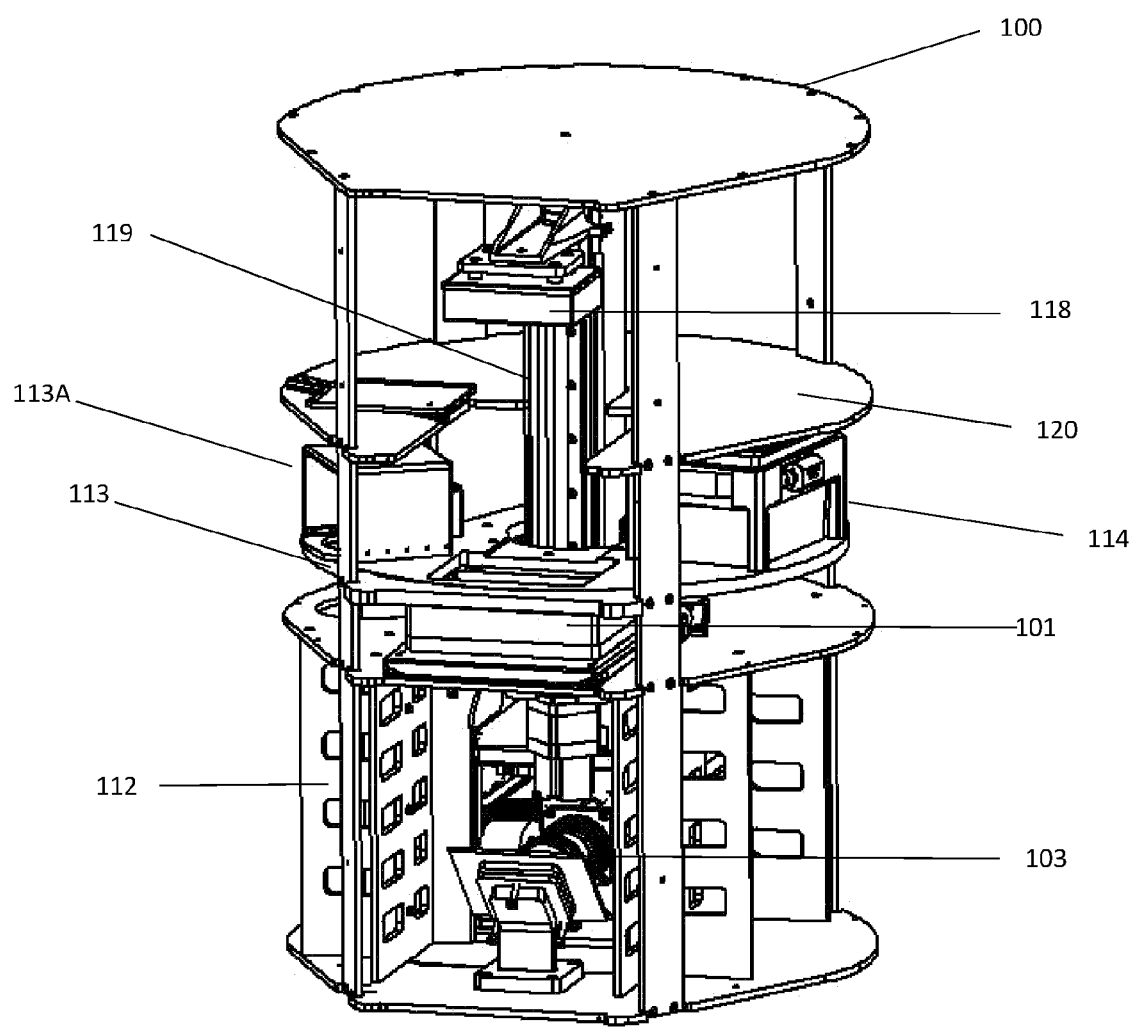
FIG. 9 shows an internal view of the device of the present invention.

In another embodiment, shown in FIGS. 8 to 18 the fully automated device 100 (FIG. 8) of the present invention comprise of a resin vessel 101 for the containment or holding of materials such as photopolymer materials to print object(s) 102, produced by the irradiation of the photopolymer contained within the resin vessel 101 or its internal vessel, from the light of an appropriate wavelength illuminated from a source 103 (FIG. 9). The source of illumination may be from additive manufacturing devices such as those disclosed in WO 2015/072921 and WO2016/122408 or SLA or DLP (mirror) may be used. The resin vessel 101 may have a substantially translucent or transparent lower wall surface that permits illumination to pass through it from below which subsequently targets the photopolymer resin. The substantially translucent or transparent wall surface may be on any side of the resin vessel as long as it allows illumination to pass through and reach the photopolymer material. This resin vessel may be situated on a non-movable or movable tray. The internal or resin vessel may also have a coating or film on its lower bottom internal surface to facilitate release of printed layer while printing. The base of the internal or resin vessel maybe coated or covered by a film/layer of Polydimethylsiloxane (PDMS), Teflon® films or coatings, such as PTFE, PFA or FEP or other materials that allow easy detachment or peeling of each printed layer of the 3D object while printing. The peeling process may be facilitated by the vertical motion of the build surface 118. In another embodiment of the invention, the movable tray may undergo, programmed or 'made to move' in a slight 'left and/or right' motion (in addition to vertical motion) to assist in the peeling process. The 'left and/or right' motion may be used in combination with the vertical motion of the build surface during the peeling process. The 'left and/or right' motion serves to release the printed layer from the build surface, whereas a vertical (up/down) motion (or at least a small up-motion) will additionally be required to position the build plate for the subsequent layer, and to facilitate reflowing of liquid resin underneath the last separated printed layer. In an additional embodiment, the 'left and/or right' motion is rotational through a small angle, so that at the radial distance from the centre of rotation, the 'left and/or right' motion is effectively not linear but rather along an arc.

Figure 10:
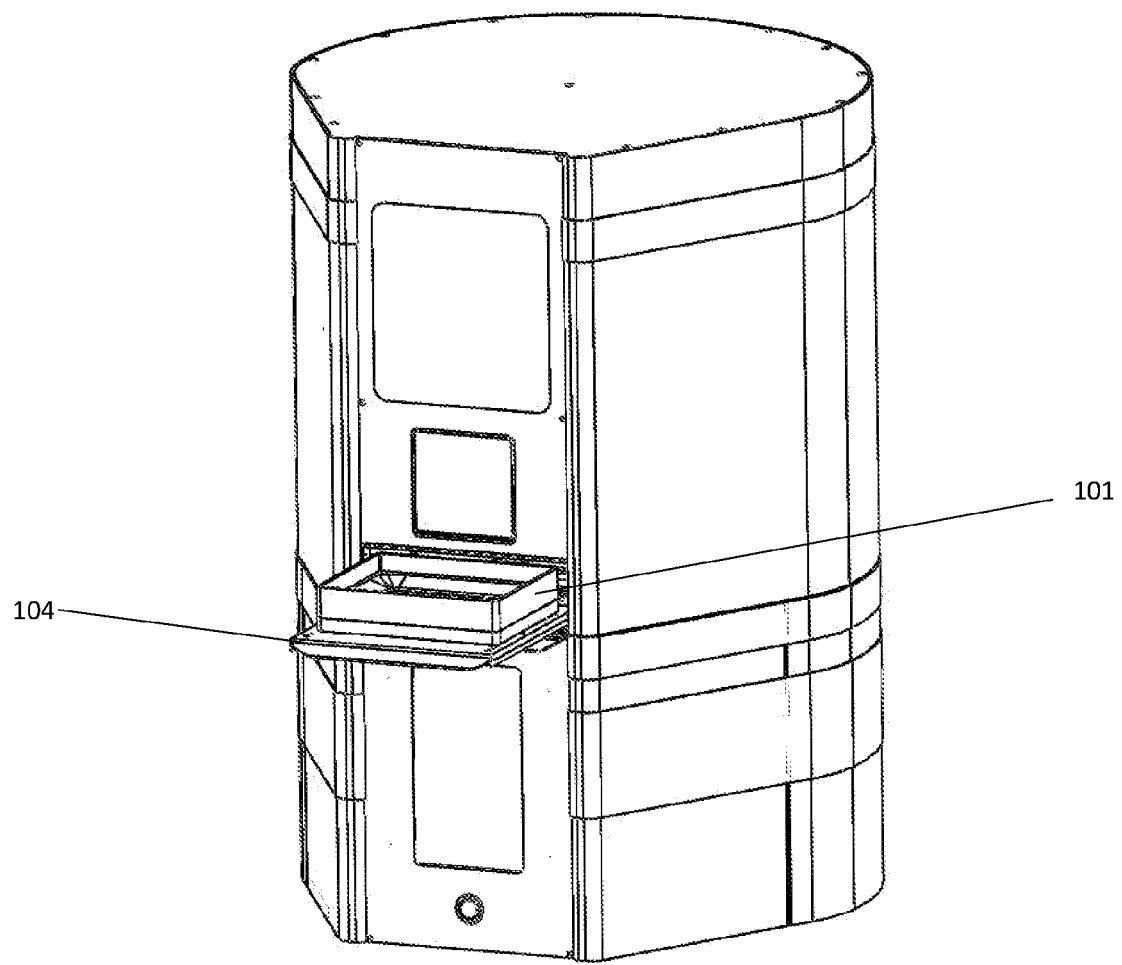
FIG. 10 shows a resin vessel on its holder extended to the exterior.
Figure 19:
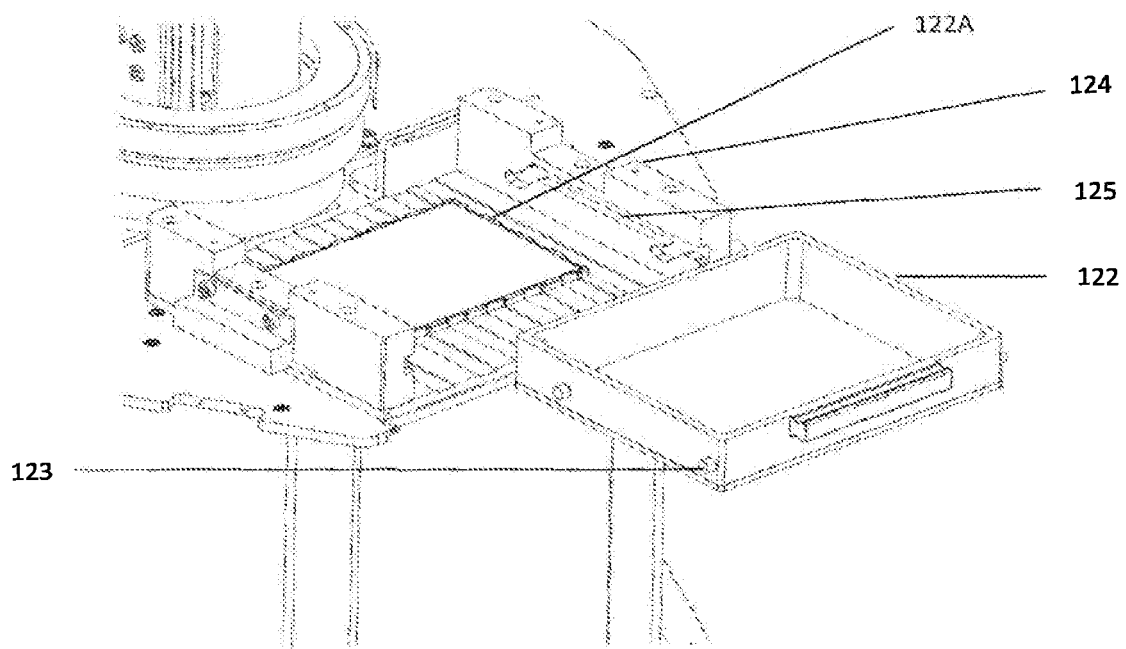
FIG. 19 shows the slot, sliding, or locking mechanism for the attachment of resin vessel and resin vessel holder.

In another embodiment, the resin vessels 101 may be removed and/or placed on sliding means, actuated means or any means that facilitate the removal and/or placement of the resin vessels. For example, the user may press upon or open an area of the printer where the resin vessel is situated and the holder for the resin vessel 104 will move/slide outwards or towards the user to facilitate the removal or placement of the resin vessel (FIG. 10). The resin vessel 101 may be situated in the direction of the source of illuminator on a stationary or non-moving tray. FIG. 19 shows a resin vessel 122 which is removable from the resin vessel holder 124. There are knobs or protrusions or the like, 123 on the surface of the resin vessels to facilitate its locking into position with grooves/holes of the sliding mechanism 125 in the resin vessel holder 124.

The Resin Vessel Storage

Figure 11:
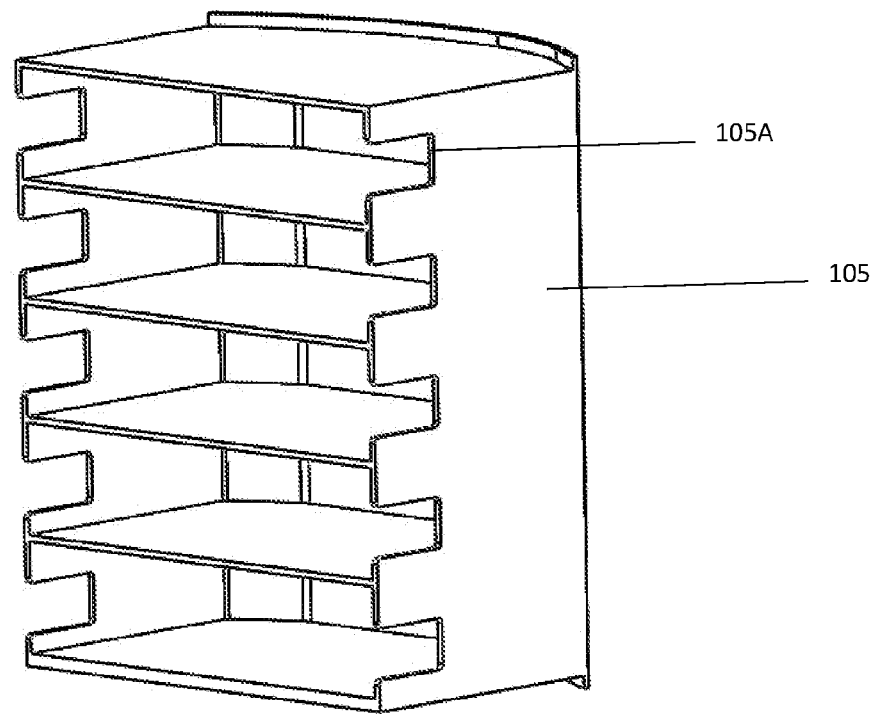
FIG. 11 shows a compartment or resin vessel storage holder.
Figure 12:
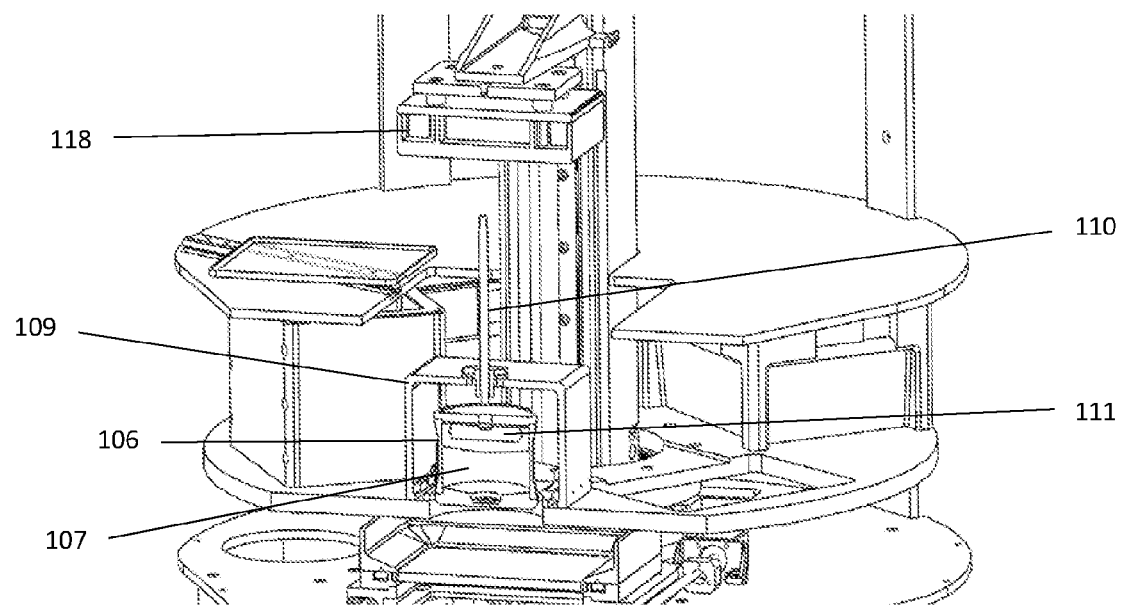
FIG. 12 shows a print capsule before the plunger pushes the inner portion of the capsule.
Figure 13:
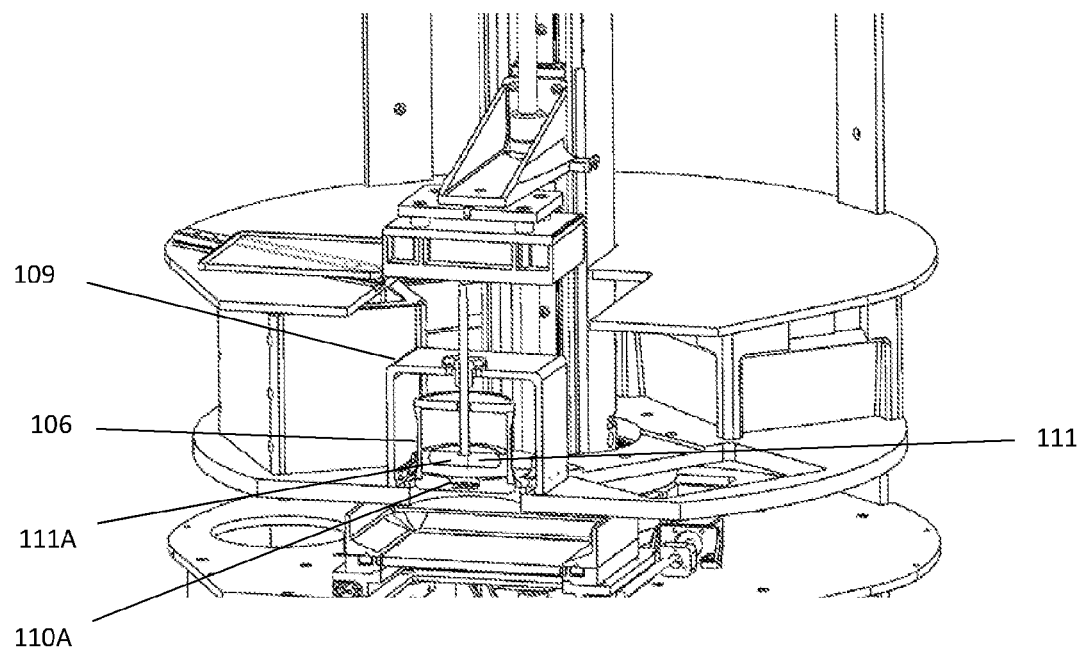
FIG. 13 shows a print capsule when the plunger pushes the inner portion of the capsule.

The resin vessel comprising of photopolymer material or different photopolymer materials may be reused after a print or a number of prints. The resin vessel may be stored or kept in a compartment of the printer for use later. The compartment or resin vessel storage holder 105 may have a number of slots or grooves to facilitate the storage of the resin vessels. The sides of the compartment or resin vessel storage holder 105 may have holes or indentation 105A to allow easy handling of the resin vessels (FIG. 11). There may be a heater below the resin vessel which may be used to maintain optimal temperature for resin storage or use.

Each resin vessel may include readable identification devices which may be readable by a tracking system. The tracking system may track the expiry dates or lifespans of the resins in these resin vessels. The type of tracking system may comprise radio frequency identification (RFID) tags, bar code indicators, QR code, optical readers or the like located on the resin vessels and may be found in other parts of the device as well where monitoring and tracking are required. This allows for easy identification and detection of internal vessels or capsules. Once an internal vessel is placed in the external vessel, the movable tray may move to a specific position where a universal RFID sensor or the like, scans and/or detects the particular internal vessel. The position of the sensor or the like, in the automated additive manufacturing device is fixed to allow the determination of each location of the printing, cleaning or curing areas. After the sensor or the like, detects the identity of the internal vessel, it will be determined if the internal vessel is placed in the correct location on the movable tray or if the usage of the internal vessel has expired. This prevents errors caused by the user or print failures due to the incorrectly inserted internal vessels or capsules in its intended location. The identification or detection of internal vessels or capsules may prevent excess usage as PDMS or similar materials may turn cloudy after a certain number of prints or the washing solution such as IPA or the like, gets dirty after a few rounds of use. This identification or detection system will ensure efficient prints and prompt the user to replace the cartridges when required. In another example, the internal vessel or capsule may also be asymmetrically shaped, so that the RFID tag, bar code indicators, QR code, optical readers, colour code or the like, always faces in the correct manner towards the universal reader, i.e. there is no possibility for the user to insert the capsule in the external vessel incorrectly, which would erroneously cause the universal reader to fail to detect the presence of the internal vessel or capsule. In addition, there may be a detector present to detect the level of the photopolymer materials in these resin vessels to prevent overflow or alert the user when there is an insufficient amount of material. In another embodiment, once the RFID tag, bar code indicators, QR code, optical readers, colour code or the like, on the external vessels, internal vessels, capsules, parts for storing photopolymers or resins, printed objects or any parts of the device are scanned or recognised by the system in the device 100, a set of instructions on how the device will proceed such as print, wash, cure or any part of the working process of the device or identification on which procedure to proceed may be downloaded or uploaded via the internet, wireless communication, internet of things, or the like or alternatively, this set of instructions may be stored in the device itself. For example, the set of instructions or procedural process may be written, encoded or embedded in the RFID tag, bar code indicators, QR code, optical readers, colour code or the like, or alternatively the RFID tag, bar code indicators, QR code, optical readers, colour code or the like, are part of the set of instructions or procedural process. The RFID tag, bar code indicators, QR code, optical readers or the like, may work together with the decentralized or centralised system of the invention. The user may also be able to purchase resins, capsules, vessels or accessories for the device using internet connection, wireless connection, web portal, an area network (local or otherwise) or a cloud-based service installed in the device which when a payment is made, the order is transferred to the warehouse or the like, for further processing or delivery of goods.

In an embodiment, the photopolymer material in the resin vessel may be supplied by a print capsule 111 which is placed within a recess of a print capsule housing 106. The print capsule may be based on a pay-per-use concept or a one-time use concept that allows the user to print an object with a print capsule containing a pre-determined amount of resin or photopolymer material sufficient for that print or a pre-determined number of prints. The identification tag, which may be an RFID tag, bar code indicators, QR code, optical readers or the like, as previously described may facilitate the monitoring of the number of prints and usage of print capsules. Said device may be arranged to alert the user to change to a new print capsule whenever the optimal amount of resin or photopolymer materials is running low or time to switch to a new capsule. It will be noted that the print capsule may include resin corresponding to a finite number of uses, and further, that the interrogation of the identification tag by a reader mounted to the device may monitor the number if uses paid for by the user. To this end, the device may prevent further operation of the device once the paid for number of uses has been exceeded, regardless of the number of uses still available for the respective print capsule. The device may then acknowledge payment of further uses, allowing operation to continue.

Figure 14:
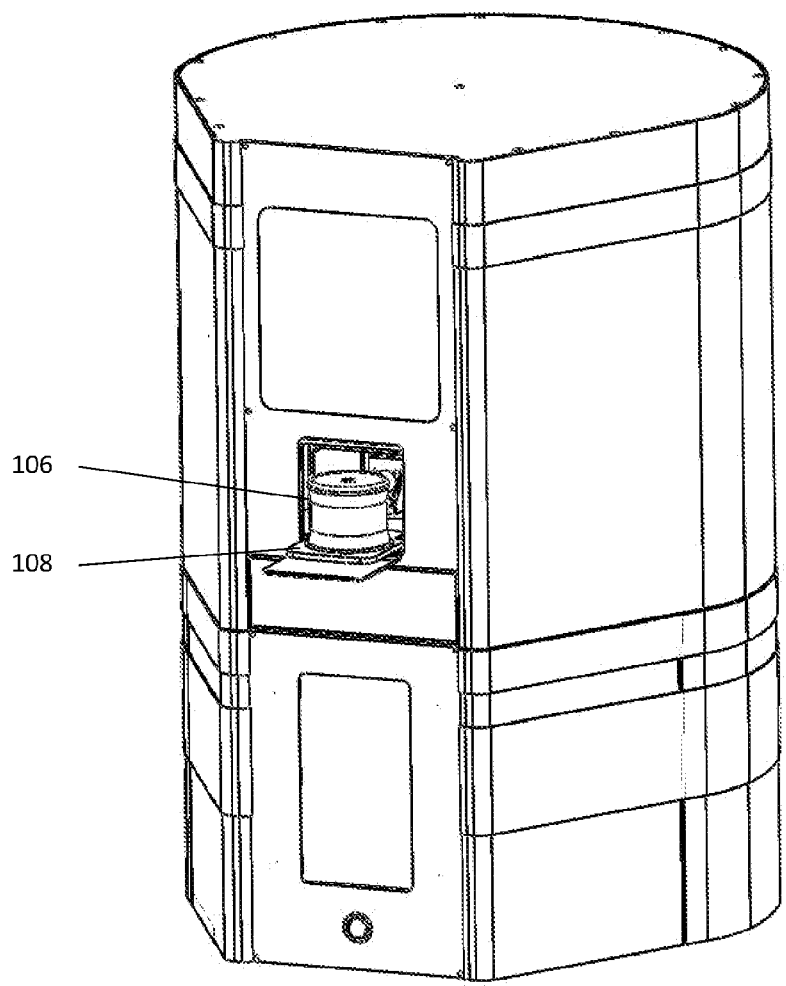
FIG. 14 shows a capsule loading slider.

The print capsule 111 may be provided as a container containing a particular type of photopolymer material required to print an object. The print capsule may be made of, for example plastic, ceramics, glass, or any material or colour that is capable of storing the photopolymer material 107 in an optimal condition. It may have grooves or indentations for ease and comfort in handling. The print capsule may comprise an upper lid portion and a lower portion that contains a valve 110A. The valve may regulate flow in more than one direction or a one-way valve may be used to regulate the flow of the photopolymer material in one direction into the resin vessel on application of pressure applied by said plunger. In an example, when a print job or an intra-oral scan of a patient (i.e. centralised feature) is initiated, the automated additive manufacturing device may send instructions to the users to insert or place it onto the capsule loading slider 108 which moves out or slides upon activation (FIG. 14). The insertion or placement of the print capsule into the device may take place at any time before printing. Once the print capsule is placed onto the capsule loading slider 108, the print platform 118 will move towards the capsule holder 109 that has a plunger 110 attached to it. The plunger may have a spring load. Also, the upper lid portion of the print capsule has an opening to allow the plunger to enter and push the inner portion 111A of the print capsule 111 which subsequently applies a downward force, so that the photopolymer material which is under the inner portion of the print capsule, can flow out of the print capsule via the valve 110A and to be injected into the resin vessel. The inner portion of the print capsule may be partially or fully encased with rubber which seals away the photopolymer material and prevents back flow. The opening of the print capsule is sealed or covered before use.

In another embodiment, the photopolymer material may be placed in the inner portion of the print capsule housing 106 that may be compressible, allowing the photopolymer material to be squeezed out when the plunger pushes the compressible inner portion. The compressible inner portion allows maximum volume of photopolymer material to be stored in a single print capsule. The compressible inner portion may be made of any material that allows optimum storage of photopolymer material and capable of being compressed under pressure. It is also possible to use a pump system to facilitate to the filling up of the resin vessel with photopolymer materials from a cartridge, container or capsule when needed. The cartridge, container or capsule may be placed at the top of the additive manufacturing device or anywhere that facilitates the flow or the delivery of the photopolymer material into the resin vessel. The aforementioned print cartridge, container or capsule may contain varying volumes of photopolymer material such as 30 ml, 50 ml, 60 ml, 100 ml, 1 L, 2 L etc. The amount of photopolymer material in the print capsule for a particular print job may only be used when required and stored for future use or the print capsules containing a predetermined amount of photopolymer material sufficient for a print job may be used and discarded. These print capsules may contain different types of photopolymer materials that print different types of objects which may require different chemical formulations. There is also a disposal area 112 in the additive manufacturing device that collects used or discarded cartridge, container or capsule. A storage for new print capsules may also be stored in the device. Once the photopolymer material has been used or emptied, the holder for these cartridge, container or capsule will move to a section in the device to dispose or store them. There may be a tracking system or the like, to monitor or track the print capsules or its parameters such as, but not limited to, the usage of photopolymer material or its shelf life. For the prevention of pigmentation or sedimentation of the photopolymer material in these print capsules, a device that facilitates vibration, shaking or rotational motion, or the like, to ensure equal homogeneity for the photopolymer material in these printed capsules may be integrated in the device. The device may run continuously in the device or work upon activation. This device may also have a heater and/or cooling feature that enables the homogeneity or prevention of pigmentation or sedimentation in the photopolymer material. This device may be present in the print capsules, capsule holder or resin vessel.

Figure 15:
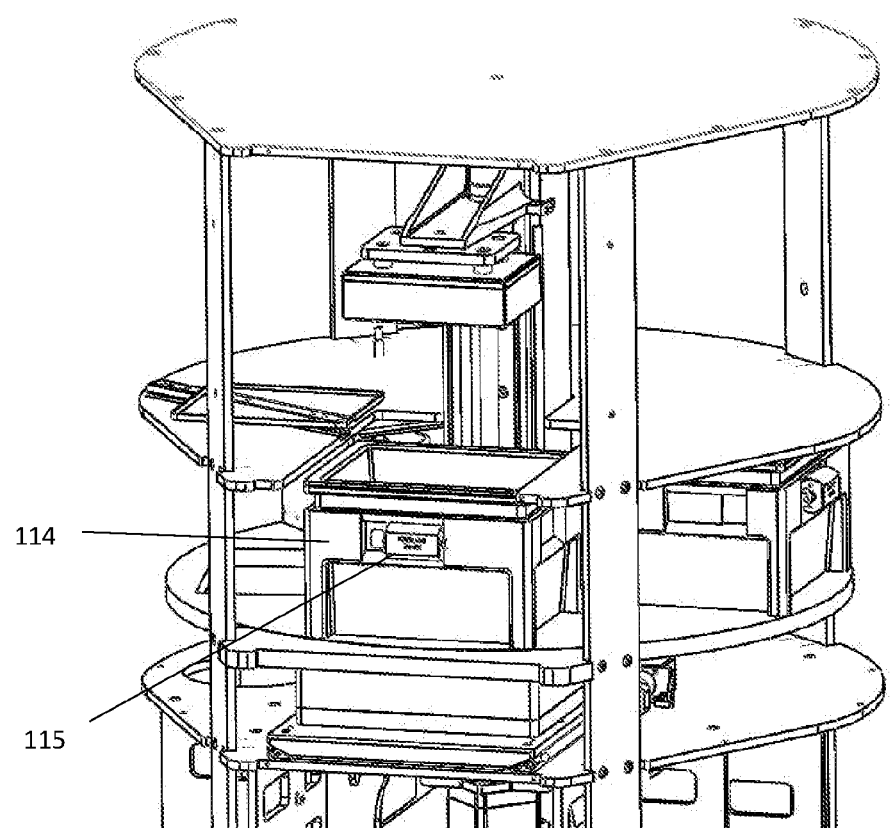
FIG. 15 shows cleaning vessels with vibrating motors.
Figure 20:
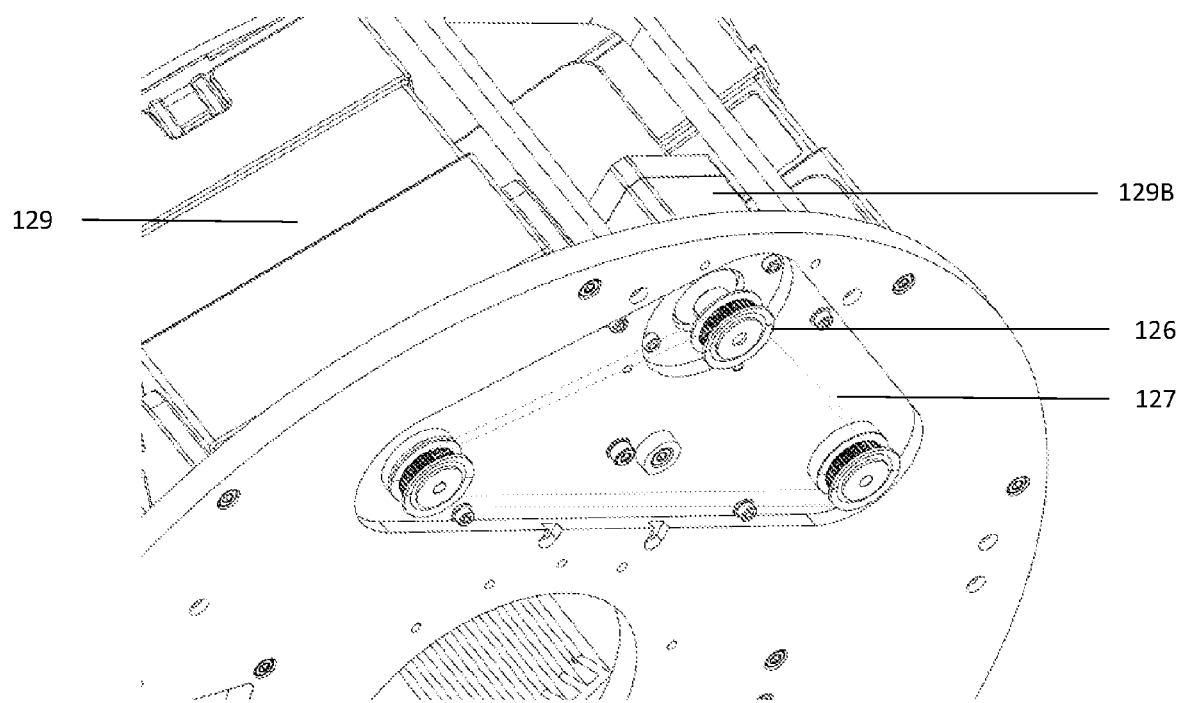
FIG. 20 shows the mechanism of a pulley system at the bottom of the washing vessel to facilitate the movement or stirring action of the magnet in the washing vessel.
Figure 22:
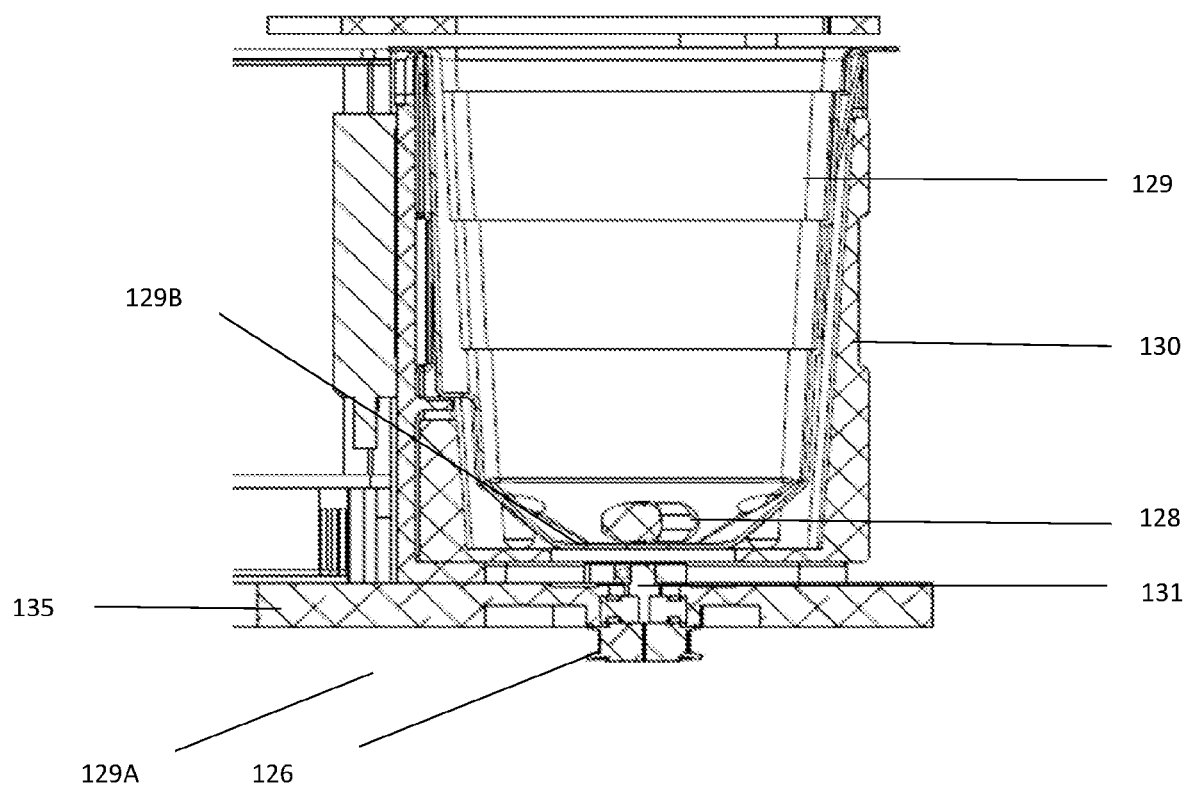
FIG. 22 shows the cross-sectional view of the washing vessel and its magnetic pulley system.

The device further comprises a moveable tray 113 where multiple vessels or devices may be permanently or non-permanently mounted on. The moveable tray is able to move in a rotational direction or in any possible direction or means so as to facilitate the movement of the vessels or devices such as the print capsule holder 113A, cleaning vessels 114 or curing devices 116 to a location that the device has been programmed to carry out in any sequence of printing, cleaning/washing or curing process. Said movable tray further includes a printing void 135A, which allows access to the print platform 118 to the resin vessel 122. The moveable tray may be controlled by a combination of one or more motor, ring gear and spur gear, belts and pulley system or circular guide systems, that allows precise accuracy in the movement of the moveable tray. Apart from the capsule holder, the moveable tray has vessels or devices such as cleaning vessels that carry out washing and may contain washing solvents such as isopropyl alcohol, or the like or solvents that aid in washing and cleaning or water. The cleaning vessel 114 may comprise of a motor 115 or more, sonic, ultrasonic or the like that allow the cleaning process to be facilitated by vibration or any similar means (FIG. 15). Speed of vibration in the motor may be dependent on the number of printed objects to be cleaned or dependant on the amount of surface area that require cleaning in the resin vessel. The speed of such vibrating motor should be sufficient enough to achieve an optimal cleaning condition of the printed object. In another embodiment, a magnet 128 driven by a pulley system at the bottom of the cleaning/washing vessel 114 may be used to facilitate the cleaning process of the printed object. FIG. 20 shows the agitation assembly 129A beneath the rotating plate 135, which includes a mechanism of a pulley system beneath the washing vessel 129 to facilitate the movement or stirring action of the washing magnet 128 in a base 129B of the washing vessel 129. The pulley system comprises one or more wheels or the like 126, facilitated by a belt or the like 127, which when activated, the wheels or the like will pull, tug or twist the belt, that will in turn rotate a guide magnet 131 present below the washing magnet in the washing vessel (FIG. 22). In an example, the pulley system consists of wheels where one is coupled to a motor 129B and two other wheels are driven by the belt or pulley. The three wheels rotate synchronously via a belt. When the motor is activated, a magnetic field is generated between the magnet 128 and the guide magnetic 131 located at the top of the pulley, allowing the generation of a mixing motion in the vessel. The washing vessel may be removable for cleaning or further processing and may be fitted into its holder 130 with ease using a slot-in mechanism or the like. In an example, the washing vessel may be removed by pulling the vessel holder 130 and removing the inner vessel 129 containing the liquid. These can be carried out without using any tools or disconnecting any part of the device mechanism allowing ease of use and increased efficiency.

Figure 16:
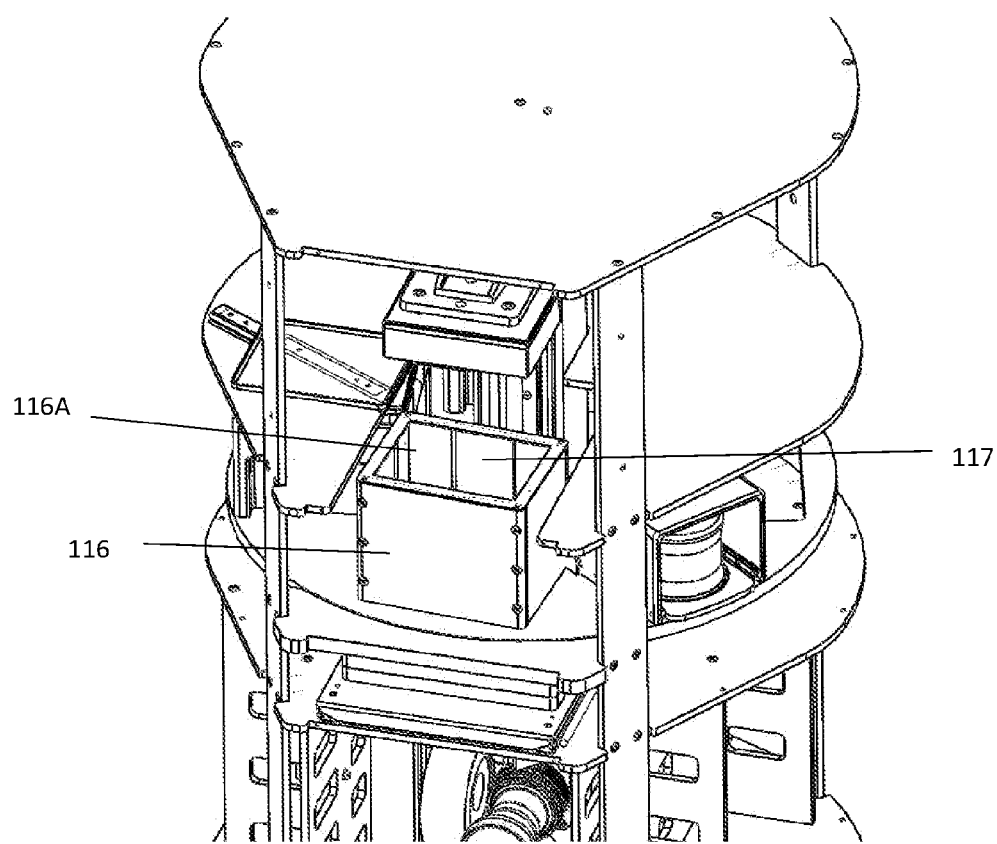
FIG. 16 shows an integrated post curing device with LEDs.
Figure 21:
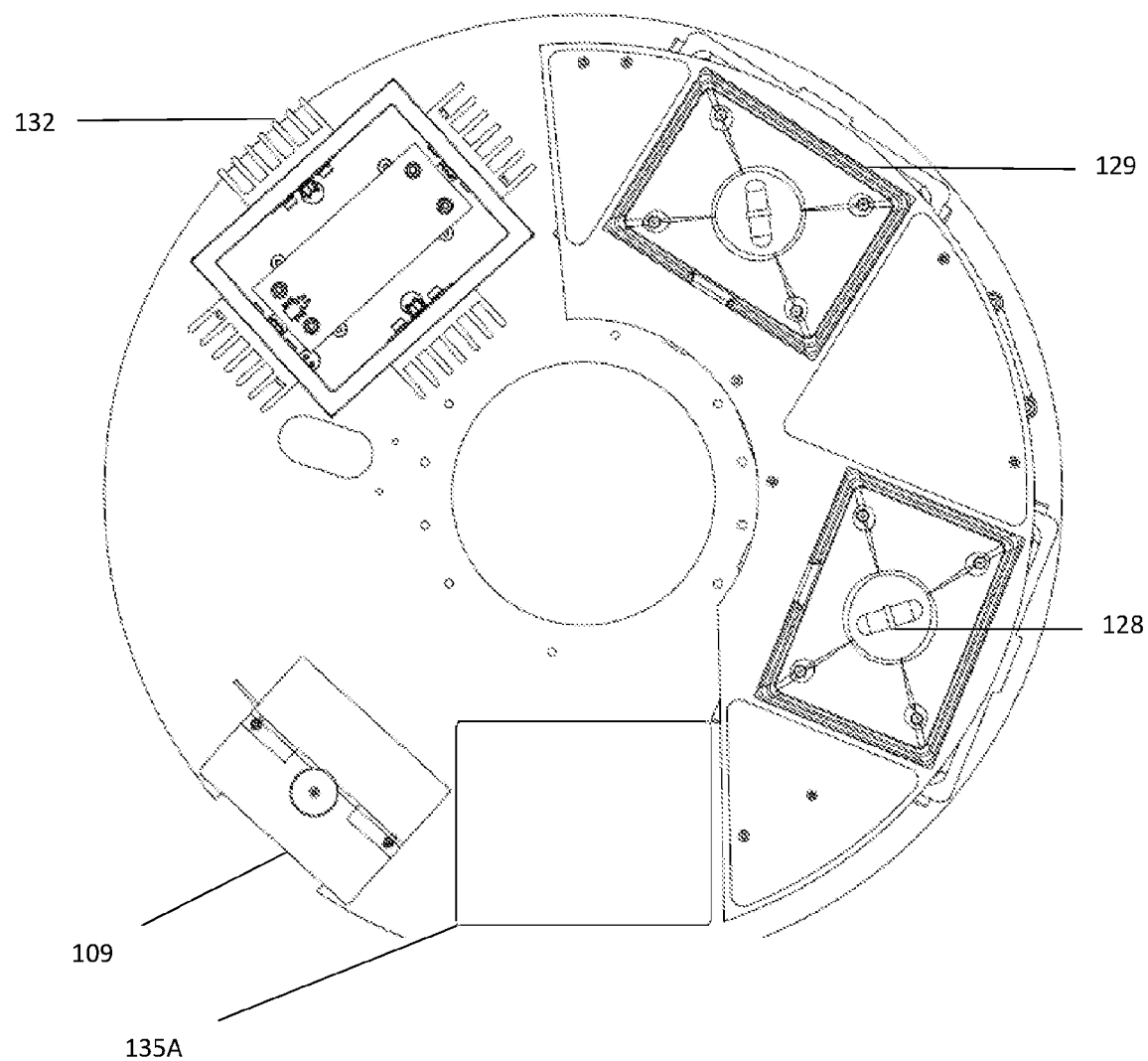
FIG. 21 shows the drip tray attached onto the moving tray.
Figure 23:
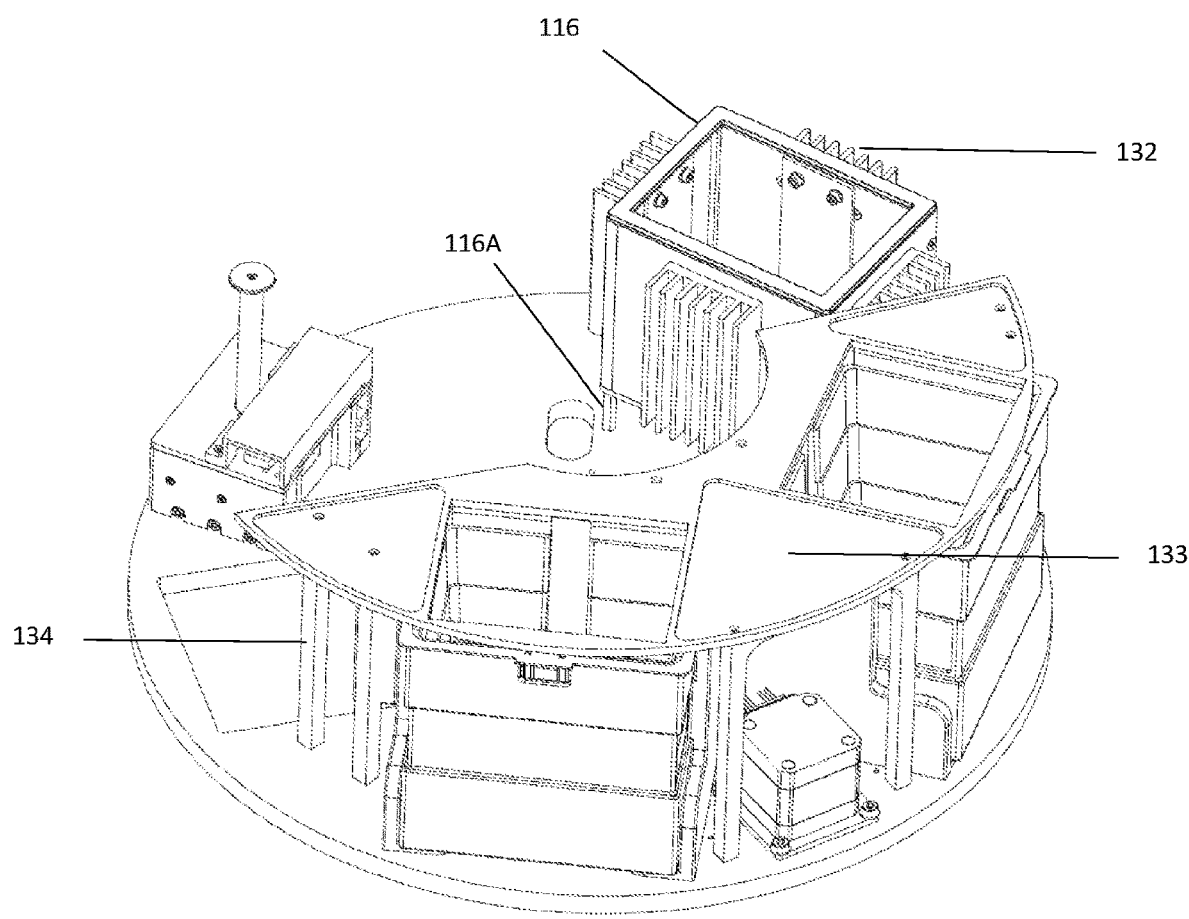
FIG. 23 shows drip trays incorporated or attached into the moving tray.

One of the other vessel or device on the moveable tray is a curing device 116. The curing device on the moveable tray may be made of metal or any materials suitable for the curing process of printed objects such as those that can withstand heat. The curing device may comprise of LEDs 117 that are present on all or some of the inner walls 116A on the device where the printed object is placed (FIG. 16). The number of LEDs and spacing of each LED is dependent on the size of the curing device, heat distribution or the internal surface area of the curing device to carry out an optimal curing process. Other alternate source of radiation or light that enables an optimal cure may be used, such examples are UV, blue LED, infrared light, or any wavelength of light or radiation that facilitate curing. The curing device may have one or more heat sinks 132 as shown in FIGS. 21 and 23 to facilitate the dispersion of heat generated from the LEDs. Preferably, each LEDs is accompanied by a heat sink, such as the sides of the tank and underneath the tank. The curing device may also have spacers 116B underneath to raise the curing device, facilitating increased air flow and thus dispersion of heat accumulation.

Figure 24:
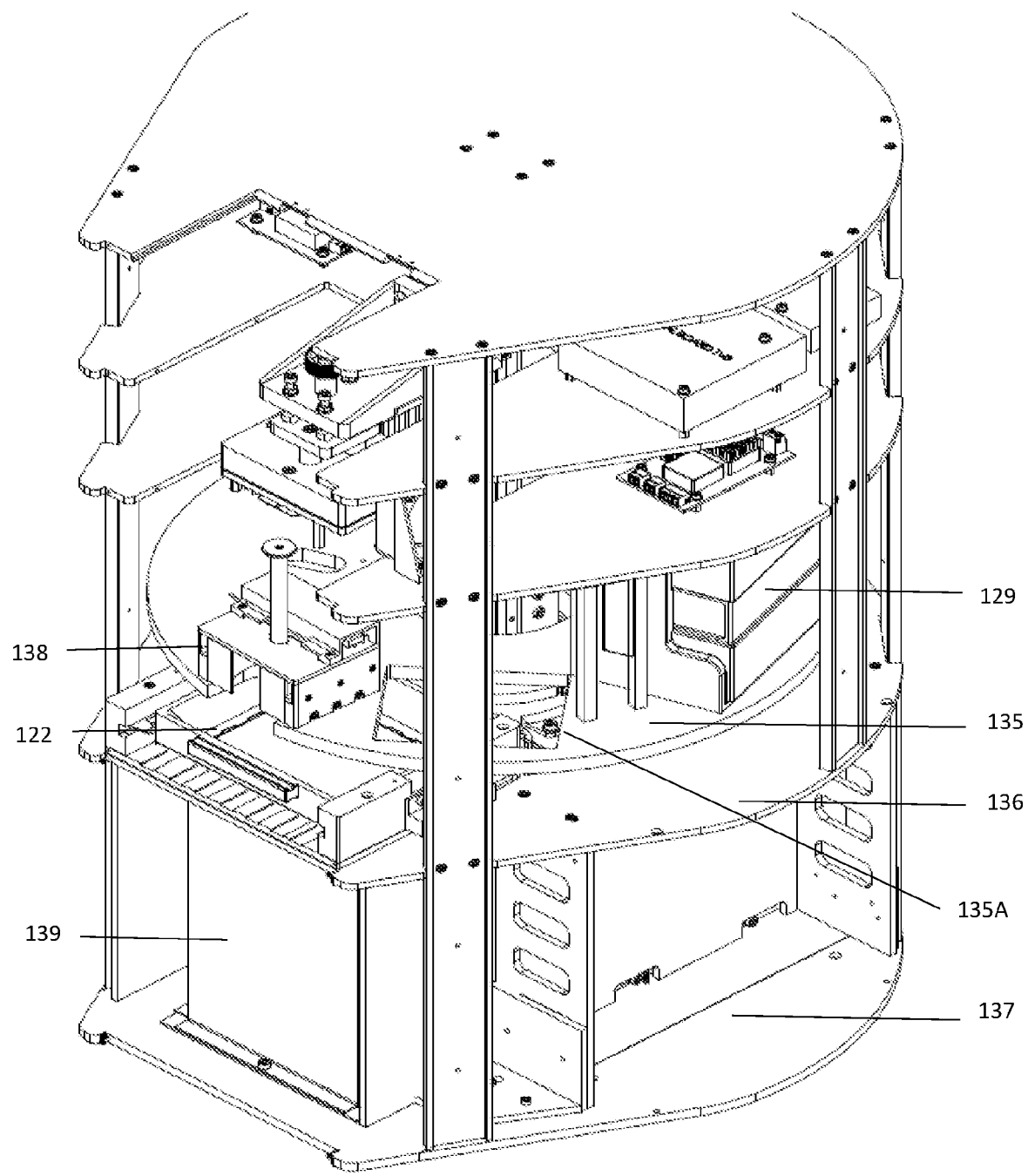
FIG. 24 shows the overall view of the interior of the device comprising a moving tray and a number of non-moving/stationary trays.
Figure 25:
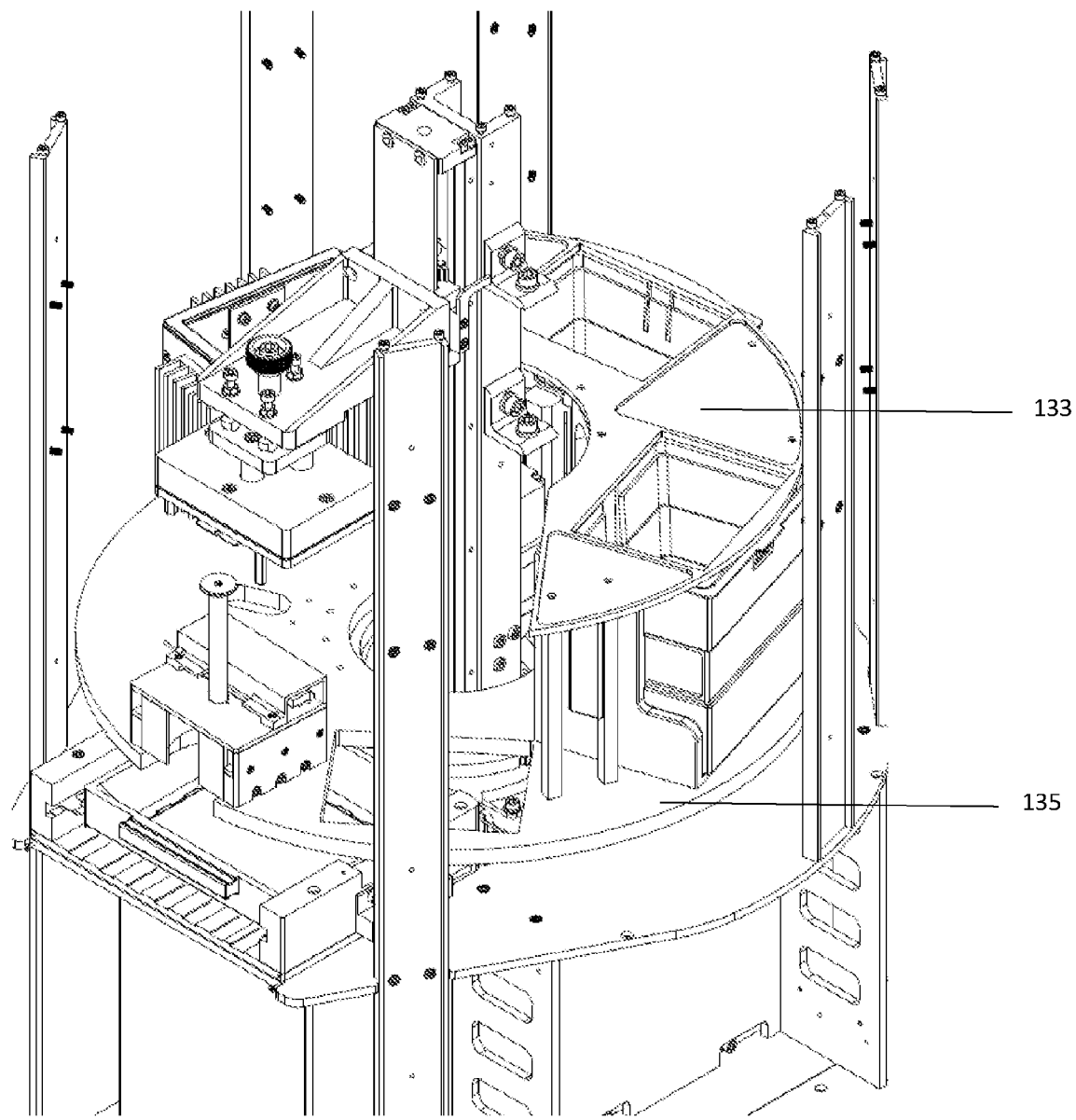
FIG. 25 shows the interior of the device and the arrangement of the trays as well as the location of the vessels and holders in the moving tray.

Electromagnets 122A or the like, may be used to ensure the resin vessel remains stationary during the stationary printing process. For example, if the source of illumination is at the bottom, the electromagnets or the like, may be fixed under the resin vessel so as to pull the resin vessel in a downward position and fix it in place to prevent movement. This ensures that the resin vessel does not move in an upward direction when the print platform moves upwards during printing. The position of the electromagnets or the like, may be in any position of the resin vessel as long as it keeps it securely in place during printing. In this example, the resin vessel and the source of illumination may be fixed and kept stationary while other parts of the additive manufacturing device are moving on the moveable tray. A vertical upward and downward linear device 119 (z axis) which may control the movement of the print platform or location of the printed object with sufficient accuracy and speed, is placed in an optimal position on, middle, near or around the moveable tray. Other examples of support and moveable for the print platform comprise of an automated robotic arm or any means which facilitates its movement to a desired position during the operation of the device. The objective of having a stationary or fixed resin vessels and/or a source of illumination is to ensure that printing is accurate and not affected or compromised by any sort of movement. In FIGS. 24 and 25, the device comprises of a moveable tray 135 where capsule holder 138, washing 129 and curing vessels are situated, whereas the resin vessel 122 and the illumination device 139 are prevented from rotation through being mounted to the fixed stationary resin vessel tray 136 and a stationary illumination tray 137, respectively.

Figure 17:
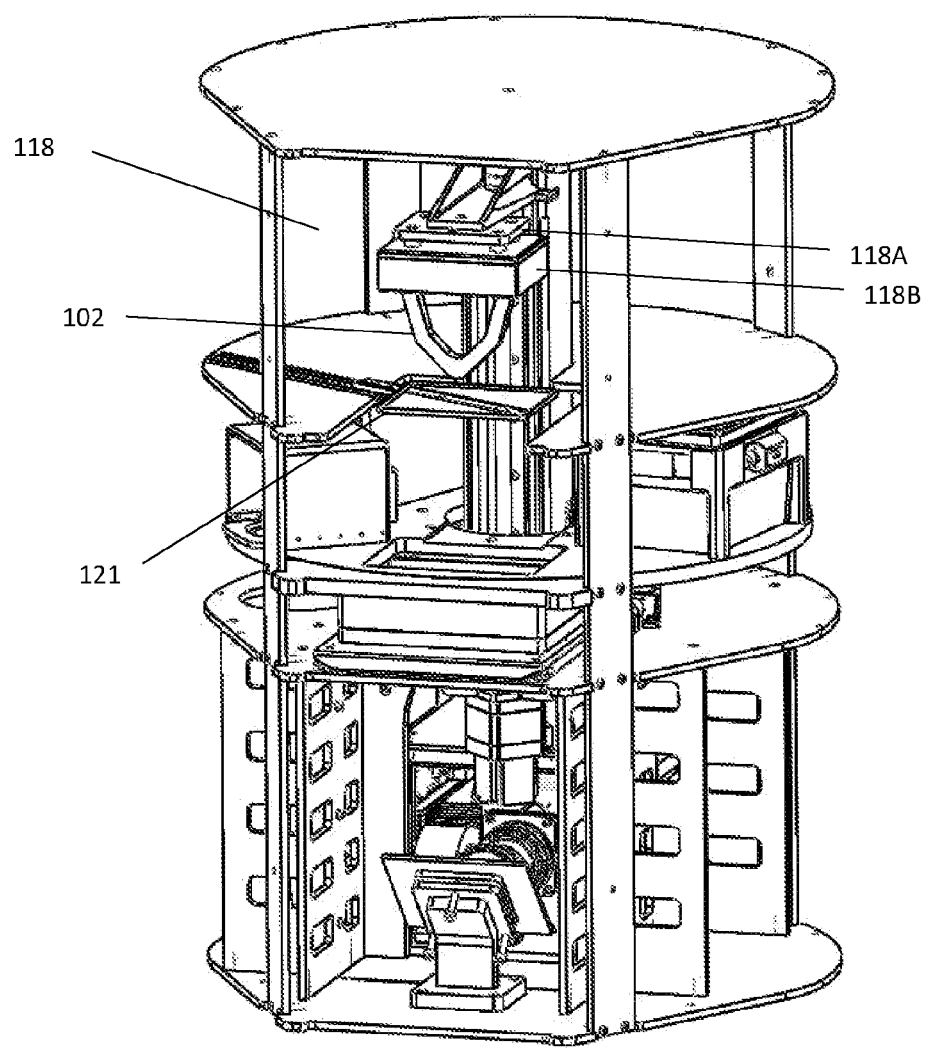
FIG. 17 shows a drip tray.
Figure 18:
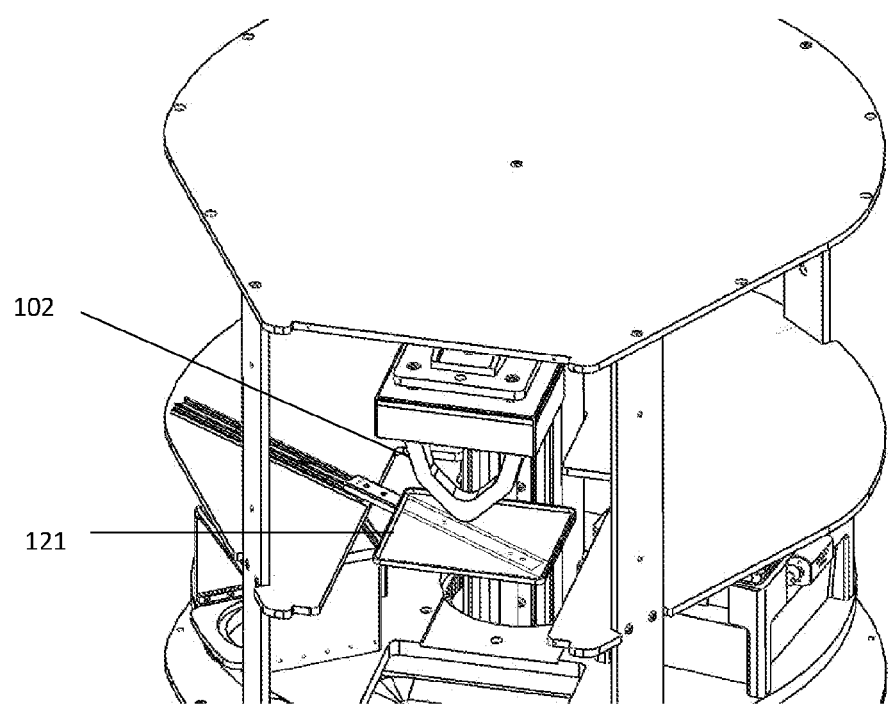
FIG. 18 shows a top view of the drip tray.

There may be another stationary sealing tray 120 situated at the top of the moving tray. This stationary sealing tray 120 seals the opening of vessels or devices such as the cleaning vessels or curing device. It prevents the loss of isopropyl alcohol, solvents or the like via evaporation or the leakage of LED light from the curing device by sealing the openings tight. This stationary sealing tray 120 may also have a drip tray 121 that moves from its original resting position to cover any of the vessels or devices described herein (FIG. 17). The drip tray 121 may be made of any material that is waterproof, chemical resistant or capable of preventing any drips. The drip tray 121 may move via sliding motion, flap, rotational manner or any means as long as it covers the openings of such vessels or devices. For example, once an object has completed its print, the print platform will move upwards along the linear device and the drip tray will slide underneath the printed object to prevent any drips from excess photopolymer material, solvents, or the like, when the moveable tray rotates to the next vessel or device for post-processing. The drip tray 121 is large enough to cover the size of the printed objects and it prevents such drips from contaminating the next vessel or device during post-processing. The drip tray 121 will move to its original resting position prior to the printed object entering a cleaning or curing process in one of the vessels or devices. In another embodiment, the drip tray 133 is incorporated or attached onto the moving tray 135 as shown in FIGS. 21 and 23. The drip tray 133 may be attached to the moving tray using supports 134.

In one embodiment, the print platform 118 may comprise of platform plate 118B which is attached to it using electromagnets 118A, magnets or the like or any other means that attaches the platform plate to the main print platform. In the magnetic release mechanism, the platform utilises a 'pop-out system' for easy removal of the 3D printed object. The platform 118 is also removable and wiped-cleanable for multiple usage. In an example after a print object 102 has undergone post-processing procedures such as cleaning and curing, the user can easily remove the plate from the print platform where the finished product or print objects are ready to be removed from the additive manufacturing device. The platform plate can be easily attached or snap in place onto the print platform 118 and may be made of steel, aluminium or any other materials which 3D printable polymers can adhere and may be coated. There may be an indentation on the print platform for the platform plate to fit in place. Alternatively, the electromagnets or the like, can be inactivated during the removal of the platform plate, facilitating its easy removal. In another embodiment, the print platform 118 may comprise of a rod or several rods or the like, that may be extended upon activation and subsequently pushing the platform plate outwards to release it. In an alternate embodiment, there is no need for any user intervention to collect the finished printed object. In this instance, once the printed object is ready for collection, this printed object is placed in a collection section of the device where it collects all the finished post-processed printed objects. After every release of the finished printed object or objects from the print platform 118 into the collection section, the print platform will pick up a new clean platform plate from a stack of these for the next print job. This allows continuous, automatic and unattended pre-processing, printing and post-processing (sequential process) without interruption from the user. For example, if the user uploads a list of jobs to print in the device, he is able to leave the device in operation overnight and unattended. The additive manufacturing device is also capable of detecting and monitoring the available storage space available for the number of prints needed.

In another embodiment, there may be an integrated section for vacuum forming for making dental aligners, a section for making surgical guide sleeves or for making any accessories. There may be an additional tray in the device where all the ready-to-be-used printed part or objects are placed or displayed for collection. Each of these objects may have an electronic display label or the like, placed next or attached to these objects displaying its respective job details, name tags or any form of identification.

Although particular embodiments have been described and illustrated herein, it will be appreciated by those of ordinary skill in the art that various modifications and combinations of features of the above embodiments are possible without departing from the spirit or essential characteristics thereof. For example, the present invention may be applicable to other fields and not limited to dental or oral health applications and therefore the term "3D object(s) or 3D printed object(s)" may also encompass any 3D part(s) or appliance(s) that result from the applications in the different fields. In addition, the number of vessels or devices on the moving or stationary trays, number of the source of illumination, print platform, plates or any storage etc. are not limited to the illustrations described or depicted herein. The user of this invention is not limited to designated humans but also to robotics or artificial intelligence or the like. The foregoing embodiments, therefore, are to be considered in all respects illustrative rather than limiting the invention described herein and the scope of the invention is indicated by the appended claims.

The invention claimed is:

1. An additive manufacturing system, comprising:
   a central station at a first location, wherein the central station is arranged to receive data from a remote station, and process the data to generate manufacturing files; and
   an additive manufacturing device, at a second location, wherein the additive manufacturing device is arranged to communicate with the central station to receive the manufacturing files, and manufacture an object based on the manufacturing files, the additive manufacturing device comprising:
      a resin vessel for containing a material which is polymerisable upon exposure to radiation;
      a build platform having a build surface arranged to have an object manufactured thereon;
      a radiation source positioned to irradiate uncured material on the build surface to manufacture the object;
      a print capsule housing, wherein the print capsule housing is arranged to receive a print capsule that provides the material in the resin vessel and that comprises an identification tag that is arranged to provide interrogatable data upon interrogation by a reader, wherein the interrogatable data enables the additive manufacturing device to identify a set of manufacturing instructions;
      a vertical device associated with the build platform, the vertical device to control movement of the build platform;
      a curing station arranged to receive and cure the object;
      at least one washing station arranged to receive the cured object, and wash the cured object to make the object ready for use by an end user,
      wherein the curing station, and the at least one washing station are located on a rotatable tray that is arranged to sequentially rotate each station around the vertical device for receiving the object from the build platform; and
      a protective cover, disposed above the rotatable tray, configured to move upwards when the rotatable tray is moving, and to apply pressure on the resin vessel, the curing station and the at least one washing station when the rotatable tray is stationary.

2. The system according to claim 1, wherein the remote station is at the second location.

3. The system according to claim 1, wherein the data comprises dental information.

4. The system according to claim 1, wherein the additive manufacturing device is arranged to automatically commence a manufacturing operation upon receipt of manufacturing files.

5. The system according to claim 1, wherein the central station is arranged to communicate with a plurality of additive manufacturing devices at a plurality of locations.

6. The system according to claim 1, wherein the central station is arranged to communicate with a plurality of remote stations at a plurality of locations.

7. The system according to claim 1, wherein the print capsule comprises a metered volume of resin corresponding to a particular number of manufacturable objects.

8. The system according to claim 1, wherein interrogatable data comprises information corresponding to one or more of: a type of resin, volume of resin, a particular number of objects manufacturable from the volume of resin, and a type of object for which the print capsule is to be used.

9. The system according to claim 1, wherein the identification tag comprises an RFID tag, a barcode, or a QR code.

10. The system according to claim 1, wherein the additive manufacturing device further comprises the reader arranged to interrogate the identification tag.

11. The system according to claim 1, wherein the at least one washing station comprises a washing vessel arranged to receive the object, and an agitation assembly that is arranged to create turbulence in the washing vessel.

12. The system according to claim 11, wherein the agitation assembly comprises a washing magnet in a base of the washing vessel, wherein the washing magnet is in magnet communication with a guide magnet beneath the washing vessel, and wherein the guide magnet is coupled to a motor and pulley system arranged to rotate the guide magnet and consequently the washing magnet.

13. An additive manufacturing method, comprising:
   receiving, from a remote station by a central station at a first location, data;
   processing, by the central station, the data to generate manufacturing files;
   communicating, by the central station, the manufacturing files to an additive manufacturing device at a second location; and
   manufacturing, by the additive manufacturing device, an object based on the manufacturing files, wherein the additive manufacturing device comprises:
      a resin vessel for containing a material which is polymerisable on exposure to radiation;
      a build platform having a build surface arranged to have an object manufactured thereon;
      a radiation source positioned to irradiate uncured material on the build surface to manufacture the object;
      a print capsule housing, wherein the print capsule housing is arranged to receive a print capsule that provides the material in the resin vessel and that comprises an identification tag that is arranged to provide interrogatable data upon interrogation by a reader, wherein the interrogatable data enables the additive manufacturing device to identify a set of manufacturing instructions;

a vertical device associated with the build platform, the vertical device to control movement of the build platform;

a curing station arranged to receive and cure the object;

at least one washing station arranged to receive the cured object, and wash the cured object to make the object ready for use by an end user, wherein the curing station, and the at least one washing station are located on a rotatable tray that is arranged to sequentially rotate each station around the vertical device for receiving the object from the build platform; and a protective cover, disposed above the rotatable tray, configured to move upwards when the rotatable tray is moving, and to apply pressure on the resin vessel, the curing station and the at least one washing station when the rotatable tray is stationary.

14. The additive manufacturing system of claim 1, wherein the additive manufacturing device further comprises an additional layer of compressible material at the bottom of the protective cover, which with the application of pressure, acts as a gasket such that the protective cover seals the resin vessel, the curing station, and the at least one washing station.

15. The additive manufacturing system of claim 1, wherein the additive manufacturing device further comprises a drip tray that is configured to move directly under the build platform to act as a cover for the resin vessel, the curing station, and the at least one washing station when the rotatable tray moves.

16. The additive manufacturing method of claim 13, wherein the additive manufacturing device further comprises an additional layer of compressible material at the bottom of the protective cover, which with the application of pressure, acts as a gasket such that the protective cover seals the curing station and the at least one washing station.

17. The additive manufacturing method of claim 13, wherein the additive manufacturing device further comprises a drip tray that is configured to move directly under the build platform to act as a cover for the resin vessel, the curing station, and the at least one washing station when the rotatable tray moves.

* * * * *